(12) United States Patent
Nakagami et al.

(10) Patent No.: US 12,478,772 B2
(45) Date of Patent: Nov. 25, 2025

(54) VALVED NEEDLE ASSEMBLY AND INDWELLING NEEDLE ASSEMBLY

(71) Applicant: NIPRO CORPORATION, Osaka (JP)

(72) Inventors: Hiroyuki Nakagami, Osaka (JP); Shingo Sakamoto, Osaka (JP); Haruo Akimoto, Osaka (JP); Ryosuke Miyazaki, Osaka (JP)

(73) Assignee: NIPRO CORPORATION, Osaka (JP)

( * ) Notice: Subject to any disclaimer, the term of this patent is extended or adjusted under 35 U.S.C. 154(b) by 221 days.

(21) Appl. No.: 16/319,937

(22) PCT Filed: Aug. 4, 2017

(86) PCT No.: PCT/JP2017/028442
§ 371 (c)(1),
(2) Date: Jan. 23, 2019

(87) PCT Pub. No.: WO2018/026006
PCT Pub. Date: Feb. 8, 2018

(65) Prior Publication Data
US 2019/0262599 A1    Aug. 29, 2019

(30) Foreign Application Priority Data

Aug. 4, 2016 (JP) ................................. 2016-153573

(51) Int. Cl.
*A61M 39/06*    (2006.01)
*A61M 25/06*    (2006.01)
*A61M 39/10*    (2006.01)

(52) U.S. Cl.
CPC ............ *A61M 39/06* (2013.01); *A61M 25/06* (2013.01); *A61M 39/1011* (2013.01); *A61M 2039/1072* (2013.01)

(58) Field of Classification Search
CPC .. A61M 39/06; A61M 39/1011; A61M 25/06; A61M 25/0606; A61M 25/0618;
(Continued)

(56) References Cited

U.S. PATENT DOCUMENTS 3,788,598 A    1/1974   German et al.
4,917,668 A    4/1990   Haindl
(Continued)

FOREIGN PATENT DOCUMENTS

CN    103209608 A    7/2013
GB    1482857 A  *  8/1977  ......... A61B 17/3498
(Continued)

OTHER PUBLICATIONS

Jun. 18, 2019 Supplementary Partial European Search Report issued in European Patent Application No. 17837107.6.
(Continued)

*Primary Examiner* — Kevin C Sirmons
*Assistant Examiner* — Antarius S Daniel
(74) *Attorney, Agent, or Firm* — Oliff PLC

(57) ABSTRACT

A valved needle assembly includes a connector having an inner hole, a pipe body fixed to a tip end of the connector, a valve body, and an assembly part in which an insertion part provided to one of the connector and the pipe body is inserted into another such that the connector is disposed within or about the pipe body. A locking protrusion and a locking part are provided to superposed faces of the connector and the pipe body in the assembly part for preventing the insertion part from dislodgment by mutual lock, and an inclined guide surface for guiding the locking protrusion is formed on a tip end in a direction of assembly of the
(Continued)

connector or the pipe body to which the locking part is provided. The valve body is incorporated by being mated with the connector and the pipe body.

11 Claims, 12 Drawing Sheets

(58) Field of Classification Search
CPC .... A61M 2039/1072; A61M 2039/062; A61M 2039/064; A61M 39/10
See application file for complete search history.

(56) References Cited

U.S. PATENT DOCUMENTS

| | | | | |
|---|---|---|---|---|
| 8,251,950 | B2* | 8/2012 | Albert | A61M 25/0618 604/110 |
| 2005/0015075 | A1* | 1/2005 | Wright | A61M 39/14 604/535 |
| 2005/0192535 | A1* | 9/2005 | Takagi | A61M 25/0606 604/164.08 |
| 2005/0251102 | A1* | 11/2005 | Hegland | F16L 37/0841 604/533 |
| 2006/0184140 | A1 | 8/2006 | Okiyama | |
| 2013/0030391 | A1* | 1/2013 | Baid | A61M 25/0618 604/272 |
| 2013/0232743 | A1 | 9/2013 | Takazakura | |
| 2015/0265499 | A1* | 9/2015 | Takeuchi | A61M 39/1011 604/414 |
| 2017/0027820 | A1 | 2/2017 | Okiyama et al. | |
| 2017/0333642 | A1* | 11/2017 | Shevgoor | A61M 5/3293 |

FOREIGN PATENT DOCUMENTS

| | | |
|---|---|---|
| JP | S54-098094 A | 8/1979 |
| JP | 3004402 U | 11/1994 |
| JP | H11-503632 A | 3/1999 |
| JP | 2004-530517 A | 10/2004 |
| JP | 2005-183315 A | 7/2005 |
| JP | 2008-097955 A | 4/2008 |
| JP | 2009-236206 A | 10/2009 |
| JP | 2014-079355 A | 5/2014 |
| JP | 2016-013359 A | 1/2016 |
| JP | 5880983 B2 | 3/2016 |
| WO | 2005/004973 A1 | 1/2005 |
| WO | WO-2013027355 A1 * | 2/2013 ......... A61M 5/3273 |
| WO | 2015/166993 A1 | 11/2015 |

OTHER PUBLICATIONS

Feb. 5, 2019 International Preliminary Report on Patentability issued in International Patent Application No. PCT/JP2017/028442.
Sep. 20, 2019 extended European Search Report issued in European Patent Application No. 17837107.6.
Sep. 5, 2017 International Search Report issued in International Patent Application No. PCT/JP2017/028442.
Dec. 31, 2020 Office Action issued in Chinese Patent Application No. 201780049060.4.
Mar. 12, 2021 Office Action issued in Japanese Patent Application No. 2018-532012.
Jul. 28, 2021 Office Action issued in Chinese Patent Application No. 201780049060.4.
Sep. 17, 2021 Office Action issued in Japanese Patent Application No. 2018-532012.
Jun. 16, 2022 Office Action issued in Chinese Patent Application No. 201780049060.4.
Feb. 28, 2022 Office Action issued in Chinese Patent Application No. 201780049060.4.
Apr. 22, 2022 Office Action issued in Japanese Patent Application No. 2018-532012.
Oct. 26, 2022 Office Action issued in Chinese Patent Application No. 201780049060.4.
Jun. 20, 2023 Office Action issued in Japanese Patent Application No. 2022-117498.
Aug. 23, 2022 Office Action issued in European Patent Application No. 17837107.6.
Oct. 10, 2023 Office Action issued in Canadian Patent Application No. 3032639.
Nov. 6, 2023 Office Action issued in Chinese Patent Application No. 202210648989.1.
Nov. 15, 2023 Office Action issued in Japanese Patent Application No. 2022-117498.
May 31, 2024 Office Action issued in Japanese Patent Application No. 2022-117498.
May 10, 2024 Office Action issued in Chinese Patent Application No. 202210648989.1.
Aug. 26, 2024 Office Action issued in Canadian Patent Application No. 3032639.

* cited by examiner

VALVED NEEDLE ASSEMBLY AND INDWELLING NEEDLE ASSEMBLY

TECHNICAL FIELD

The present invention relates to a needle assembly and an indwelling needle assembly that punctures a blood vessel and are used for infusion, blood collection, or the like, and more particularly, to a valved needle assembly having a valve body therein so that a fluid flow path is adapted to be closed and an indwelling needle assembly.

BACKGROUND ART

Conventionally, needle assemblies used for infusion, blood collection, or the like are known. The needle assembly includes a hollow needle that punctures a blood vessel, and a connection hub to which an external flow path is connected. By such a needle assembly being stuck into a blood vessel of a patient and an external flow path being connected to the connection hub, a fluid flow path is formed from the blood vessel to the external flow path through the interior of the needle assembly, and infusion, blood collection, or the like are carried out through the fluid flow path.

Incidentally, there is a valved needle assembly in which a valve body is provided inside the needle assembly so that the fluid flow path can be blocked by the valve body.

For example, in a valved needle assembly described in U.S. Pat. No. 4,917,668 (Patent Document 1), by opening and closing the valve body in conjunction with connection and removal of the external flow path, communication and blocking of the fluid flow path are switched. That is, a valve body with a slit is provided inside a needle hub that fixedly supports a hollow needle, and a pusher is disposed on the base end side of the valve body. By inserting and connecting the external flow path to the connection hub connected to the base end side of the needle hub, the tip end of the external flow path pushes in the pusher, and pushes the slit of the valve body open so as to place the fluid flow path in a communicating state.

In addition, a coil spring in a compressed state is provided on the tip end side of the valve body, so that the coil spring is configured to undergo extension deformation due to expanding deformation of the valve body as described above. Accordingly, by removing the external flow path from the connection hub, the coil spring deforms due to recovering action, closes the slit of the valve body, and pushes back the pusher to the initial position, so as to place the fluid flow path in a blocked state.

Furthermore, Japanese Domestic Publication of International Patent Application No. JP-A-2004-530517 (Patent Document 2) discloses a valved needle assembly constituted by including a coil spring and a valve body assembled between a needle hub that fixedly supports a hollow needle and a connection hub to which a syringe serving as an external flow path is connected. With the valved needle assembly described in Patent Document 2 as well, the valve body is opened and closed in conjunction with the connection and removal of the connection hub and the external flow path, so as to switch the communication and blocking of the fluid flow path.

However, in the valved needle assemblies described in the above-mentioned Patent Document 1 and Patent Document 2, since the coil spring is provided in order to stably place the slit in a closed state at the time of removing the external flow passage, an increase in the number of parts or the number of assembling steps, and further an increase in the size of the needle assembly could not be avoided. Besides, it was difficult to assemble the needle assembly since it is necessary to fix the valve body, the needle hub, the connection hub or the like against the urging force of the coil spring at the time of assembly. In addition, when the needle hub and the connection hub are fixed with an adhesive or the like, there is a problem that the adhesive leaks into the fluid flow path of the needle assembly, the number of bonding steps increases, or the like.

BACKGROUND ART DOCUMENT

Patent Document

Patent Document 1: U.S. Pat. No. 4,917,668
Patent Document 2: JP-A-2004-530517

SUMMARY OF THE INVENTION

Problem the Invention Attempts to Solve

The present invention has been made in view of the above circumstances, and it is an object of the present invention to provide a valved needle assembly and an indwelling needle assembly of a novel structure capable of more firmly fixing a valve body with a simple structure, while making the assembly easy so as to improve production efficiency.

Means for Solving the Problem

The above and/or optional objects of this invention may be attained according to at least one of the following preferred embodiments of the invention. The following preferred embodiments and/or elements employed in each preferred embodiment of the invention may be adopted at any possible optional combinations.

A first preferred embodiment of the present invention provides a valved needle assembly comprising: a connector having an inner hole; a pipe body fixed to a tip end part of the connector; a valve body; an assembly part in which an insertion part provided to one of the connector and the pipe body is inserted into another such that the connector is disposed within or about the pipe body; a locking protrusion and a locking part provided to superposed faces of the connector and the pipe body in the assembly part, the locking protrusion and the locking part preventing the insertion part from dislodgment by mutual lock; and an inclined guide surface formed on a tip end portion in a direction of assembly of either one of the connector and the pipe body to which the locking part is provided, the inclined guide surface guiding the locking protrusion, wherein the valve body is incorporated by being mated with the connector and the pipe body.

According to the valved needle assembly structured following this preferred embodiment, the insertion part of one of the connector and the pipe body is inserted into the other, and the locking protrusion is locked to the locking part, whereby the connector and the pipe body can be easily assembled. Besides, the locking protrusion is guided by the inclined guide surface and moves to the locking position with the locking part, thereby further facilitating the assembly of the connector and the pipe body.

Moreover, unlike the conventional valved needle assembly, there is no need to provide a coil spring, and the valve body can be stably incorporated by being mated with the connector and the pipe body.

A second preferred embodiment of the present invention provides the valved needle assembly according to the first preferred embodiment, wherein the locking protrusion is provided on an outer surface of the insertion part, the locking protrusion having an inclined surface whose protruding dimension gradually increases from a front toward a back in a direction of insertion, the inclined guide surface is formed on an inner surface of the one of the connector and the pipe body into which the insertion part is inserted, the inclined guide surface gradually expanding toward a tip end in the direction of assembly, and the locking part is positioned at the back of the inclined guide surface in the direction of assembly.

According to the valved needle assembly structured following this preferred embodiment, when one of the connector and the pipe body is inserted into the other, the inclined surface and the inclined guide surface abut against each other. This may exhibit a good guiding action and reduce insertion resistance.

A third preferred embodiment of the present invention provides the valved needle assembly according to the first or second preferred embodiment, wherein the locking protrusion and the locking part are provided to the connector and the pipe body circumferentially partially at positions that correspond to each other in a circumferential direction, and the one of the connector and the pipe body to which the locking part is provided includes a guide groove extending from the tip end portion thereof in the direction of assembly toward the locking part, and the inclined guide surface is constituted by a groove bottom face of the guide groove.

According to the valved needle assembly structured following this preferred embodiment, since the locking protrusion and the locking part are provided circumferentially partially at the positions that correspond to each other in the circumferential direction. Thus, by locking the locking protrusion with the locking part, the connector and the pipe body can be assembled nonrotatably with respect to each other. Besides, the guide groove having the inclined guide surface as the groove bottom face is formed in the connector or the pipe body. Thus, by inserting the locking protrusion into the guide groove, relative rotation of the connector and the pipe body in the circumferential direction may be avoided, thereby more reliably guiding the locking protrusion to the locking part.

A fourth preferred embodiment of the present invention provides the valved needle assembly according to any one of the first to third preferred embodiments, wherein a peripheral wall of the one of the connector and the pipe body includes an engaging hole having the locking part, and the locking protrusion is engaged with the engaging hole.

According to the valved needle assembly structured following this preferred embodiment, the locking protrusion provided on the one of the connector and the pipe body is engaged with the engaging hole provided to the other of the connector and the pipe body. Therefore, for example, when the external flow path is pulled out to the base end side by being rotated or without being rotated so as to be removed from the connection hub (connector), it is possible to effectively prevent the connector from being dislodged from the pipe together with the external flow path.

A fifth preferred embodiment of the present invention provides the valved needle assembly according to any one of the first to fourth preferred embodiments, wherein a peripheral wall of either one of the connector and the pipe body includes a notch part extending from an opening edge on an axial end thereof toward an axial inside thereof.

According to the valved needle assembly structured following this preferred embodiment, by providing the notch part on the axial end of the connector or the pipe body, the peripheral wall of the connector or the pipe body at the axial end is allowed to readily undergo flexural deformation in the direction of expansion. Thus, the insertion resistance can be reduced when the one of the connector and the pipe body is inserted into the other. Furthermore, since the axial end of the connector or the pipe body readily undergoes flexural deformation, the locking protrusion and the locking part can be more easily engaged with each other.

A sixth preferred embodiment of the present invention provides the valved needle assembly according to any one of the first to fifth preferred embodiments, wherein the valve body comprises a disc valve, the disc valve includes a tubular support part provided to an outer circumferential portion thereof and extending in an axial direction, and the tubular support part is sandwiched between the pipe body and the connector and pressed in a thickness direction.

According to the valved needle assembly structured following this preferred embodiment, the disc valve is provided with the tubular support part, thereby effectively preventing the disk valve from dislodgment or the like, when the external flow path is connected, for example. Particularly, since the tubular support part is sandwiched between the pipe body and the connector in a pressed state, it is possible to more effectively prevent the disc valve from dislodgment, when the external flow path is connected, for example.

A seventh preferred embodiment of the present invention provides the valved needle assembly according to the sixth preferred embodiment, wherein the tubular support part extends from the outer circumferential portion of the disc valve to a base end side thereof, the disc valve includes a base end concave groove formed on a base end surface of the outer circumferential portion of the disc valve, the base end concave groove extending on a radial inside of the tubular support part in a circumferential direction, and a tip end portion of the connector is positioned within the base end concave groove.

According to the valved needle assembly structured following this preferred embodiment, the base end concave groove is provided on the base end surface of the disc valve, and the tip end portion of the connector is positioned within the base end concave groove. Therefore, positioning at the time of assembly of the disc valve and the connector can be easily achieved, and a force for supporting the disc valve by the connector can be improved.

An eighth preferred embodiment of the present invention provides the valved needle assembly according to the sixth or seventh preferred embodiment, wherein the disc valve includes a slit formed in a central portion thereof, the tubular support part extends from the outer circumferential portion of the disc valve to a base end side thereof, and an axial length of the tubular support part is not less than a half of a thickness dimension of the central portion of the disc valve where the slit is formed.

According to the valved needle assembly structured following this preferred embodiment, the axial length of the tubular support part is sufficiently obtained, and the effect of supporting the disc valve by the connector or the pipe body may be improved.

A ninth preferred embodiment of the present invention provides the valved needle assembly according to any one of the first to eighth preferred embodiments, wherein the valve body comprises a disc valve, the disc valve includes a tip end tubular part provided to an outer circumferential portion thereof and extending to a tip end side thereof, the pipe body includes an annular support part provided to a radial inside thereof and protruding toward a base end side thereof in an axial direction, and the tip end tubular part of the disc valve is superposed on and supported by an outer circumferential surface of the annular support part.

According to the valved needle assembly structured following this preferred embodiment, on the tip end side of the disc valve, the tip end tubular part is superposed on and supported by the annular support part of the pipe body. This may stably support the disc valve between the connector and the pipe body, so as to prevent the disc valve from dislodgment when the external flow path is connected, for example, and to further improve closing performance of the disc valve at the time of removing the external flow path.

A tenth preferred embodiment of the present invention provides the valved needle assembly according to the ninth preferred embodiment, wherein the disc valve includes a tip end concave groove formed on a tip end surface of the outer circumferential portion of the disc valve, the tip end concave groove extending on a radial inside of the tip end tubular part in a circumferential direction, and a tip end portion of the annular support part is positioned within the tip end concave groove.

According to the valved needle assembly structured following this preferred embodiment, the tip end concave groove is provided on the tip end surface of the disc valve, and the annular support part of the pipe body is positioned within the tip end concave groove. Therefore, positioning at the time of assembly of the disc valve and the pipe body can be easily achieved, and a force for supporting the disc valve by the pipe body can be improved.

In particular, in combination with the seventh preferred embodiment, the connector and the pipe body are positioned within the respective concave grooves provided on both axial surfaces of the disc valve. This may further facilitate the assembly of the connector and the pipe body, as well as further improve the force for supporting the disc valve.

An eleventh preferred embodiment of the present invention provides the valved needle assembly according to any one of the first to tenth preferred embodiments, wherein the valve body comprises a disc valve, the disc valve includes a slit formed in a central portion thereof, and an outer circumferential surface of the disc valve is pressed radially inward by a pressing part provided to either one of the connector and the pipe body.

According to the valved needle assembly structured following this preferred embodiment, the outer circumferential surface of the valve body, which is the disc valve, is supported between the connector and the pipe body in a state of being pressed radially inward by the pressing part. This may effectively prevent the disc valve from dislodging from between the connector and the pipe body.

There may be a case in which the valved needle assembly according to this preferred embodiment serves as an outer needle, and is used as an indwelling needle assembly in combination with an inner needle inserted into the outer needle. At that time, the slit of the disc valve is more effectively closed off by the pressing force from the pressing part. Thus, when the inner needle is pulled out of the outer needle, the blood adhering to the inner needle is rubbed off by the disc valve, as well as the closing operation of the slit is promptly realized, thereby more stably preventing leakage of the blood.

A twelfth preferred embodiment of the present invention provides the valved needle assembly according to any one of the first to eleventh preferred embodiments, wherein the connector houses a pusher movably in an axial direction, the pusher being configured to open a slit provided to the valve body and establish a communicating state by being pressed against a base end surface of the valve body, and the connector includes an engaging wall part configured to determine a moving end of the pusher in the axial direction.

According to the valved needle assembly structured following this preferred embodiment, in the case in which the moving end of the pusher to the tip end side is determined by the engaging wall part, for example, when the external flow path is connected, damage or the like to the disc valve due to excessive pushing toward the tip end side can be avoided. Meanwhile, in the case in which the moving end of the pusher to the base end side is determined by the engaging wall part, when the pusher is pushed back to the base end side at the time of removal of the external flow path, the pusher can be stably positioned at a predetermined position.

A thirteenth preferred embodiment of the present invention provides the valved needle assembly according to any one of the first to twelfth preferred embodiments, wherein a base end side of the connector extends from a base end part of the pipe body in an axial direction, and the connector includes an annular connection projection formed on an outer circumferential surface of an end of the base end side of the connector, the annular connection projection being provided with a screw thread on an outer circumferential surface thereof.

According to the valved needle assembly structured following this preferred embodiment, the connection protrusion having the screw thread is formed on the base end of the connector. This makes it possible to connect a luer-lock type external flow path, thereby more reliably realizing the connection between the connector and the external flow path.

A fourteenth preferred embodiment of the present invention provides an indwelling needle assembly comprising: an inner needle unit comprising an inner needle having a sharp needle tip on a distal side thereof, and an inner needle hub provided on a proximal side of the inner needle; an outer needle unit comprising an outer needle into which the inner needle is inserted, an outer needle hub to which the outer needle is attached at a distal side opening thereof and into which the inner needle is inserted from a proximal side opening thereof, and the valved needle assembly according to any one of the first to thirteenth preferred embodiments; a protector provided to the inner needle unit and into which the inner needle is inserted movably in a needle axis direction, and configured to be able to house and protect the needle tip of the inner needle; and a cap body provided on a proximal side of the outer needle unit and configured such that the protector is movable in the needle axis direction relatively to the cap body, wherein the protector is movable together with the inner needle to the proximal side relatively to the cap body with the needle tip housed in the protector, an engaging part and an engaging target part that are engaged with each other are formed at mutually corresponding sites between the cap body and the protector, the engaging part and the engaging target part hold the protector in a connected state to the cap body by mutual engagement, and when the protector moves from the connected state to the proximal side, the engaging part and the engaging target part release the engagement while generating a sense of clicking such that the protector is allowed to be detached from the cap body.

According to the indwelling needle assembly structured following this preferred embodiment, the cap body and the protector can be physically coupled by the engaging part and the engaging target part. Thus, by adjusting the shapes of the engaging part and the engaging target part, the degree of engagement of the engaging part and the engaging target part, that is, the engaging force can be adjusted. This makes it possible to adjust the pulling force required for the operator when detaching the protector from the cap body, thereby adjusting the sense of clicking when detaching the protector from the cap body.

A fifteenth preferred embodiment of the present invention provides the indwelling needle assembly according to the fourteenth preferred embodiment, wherein the engaging part includes at least one convex engaging portion.

According to the indwelling needle assembly structured following this preferred embodiment, since the engaging part includes the convex engaging portion, by engaging the convex engaging portion with the engaging target part, it is possible to couple the cap body and the protector. That is, by changing or adjusting the shape or size of the convex engaging portion, the engaging force between the cap body and the protector can be easily adjusted, thereby easily adjusting the sense of clicking when detaching the protector from the cap body as well.

A sixteenth preferred embodiment of the present invention provides the indwelling needle assembly according to the fifteenth preferred embodiment, wherein the cap body includes a plurality of flexible pieces that flex in a radial direction, and the at least one convex engaging portion comprises a plurality of convex engaging portions, and the convex engaging portions are disposed correspondingly to the respective flexible pieces.

According to the indwelling needle assembly structured following this preferred embodiment, one of the cap body and the protector includes a plurality of flexible pieces that are able to flex in the radial direction, and each of the flexible pieces is provided with a convex engaging portion, and is engaged with the engaging target part provided to the other of the cap body and the protector. That is, when the protector is detached (pulled out) from the cap body, the flexible piece is deformed in a flexural manner in the radial direction by the convex engaging portion, thereby avoiding excessive increase in the pull-out resistance. Also, by adjusting the length or the like of the flexible piece, it is possible to adjust the ease of flexural deformation of the flexible piece, that is, the magnitude of the pull-out resistance when pulling out the protector from the cap body, thereby easily adjusting the sense of clicking when detaching the protector from the cap body.

A seventeenth preferred embodiment of the present invention provides the indwelling needle assembly according to the sixteenth preferred embodiment, wherein the outer needle unit further comprises an outer needle cap provided on a proximal side of the outer needle hub and into which a distal side of the cap body is inserted, the flexible pieces are spaced from each other in a circumferential direction, and the outer needle cap includes notches formed at positions corresponding to the respective flexible pieces.

According to the indwelling needle assembly structured following this preferred embodiment, the cap body is housed in the outer needle cap, and the notches are formed in the outer needle cap at the positions corresponding to the flexible pieces of the cap body. Accordingly, the notches allow the flexible pieces to undergo flexural deformation outward in the radial direction. This may effectively avoid excessive increase in the pull-out resistance when the protector is detached (pulled out) from the cap body.

An eighteenth preferred embodiment of the present invention provides the indwelling needle assembly according to any one of the fourteenth to seventeenth preferred embodiments, wherein the protector includes a large-diameter part on a distal side thereof, the large-diameter part being larger in diameter than a portion on a proximal side thereof, the large-diameter part includes a housing space that houses the needle tip, and a shutter mechanism that closes the housing space, the cap body includes the engaging part, and the large-diameter part serves as the engaging target part and is configured to be engaged with the engaging part of the cap body.

A nineteenth preferred embodiment of the present invention provides the indwelling needle assembly according to any one of the fourteenth to seventeenth preferred embodiments, wherein the protector includes a large-diameter part on a distal side thereof, the large-diameter part being larger in diameter than a portion on a proximal side thereof, the large-diameter part includes a housing space that houses the needle tip, and a shutter mechanism that closes the housing space, a lid body serving as the engaging target part is externally mounted on the large-diameter part, and the engaging part is configured to be engaged with the lid body.

According to the indwelling needle assembly structured following these preferred embodiments, the needle tip of the inner needle after puncture is housed in the housing space, and the housing space is closed by the shutter mechanism. Accordingly, for example, even when an external force is exerted on the inner needle after the needle tip being housed in the housing space, the needle tip is prevented from re-protruding from the housing space. Therefore, the protection of the inner needle after the puncture is more reliably realized, thereby effectively reducing the risk of inadvertent puncture or the like.

Effect of the Invention

According to the valved needle assembly and the indwelling needle assembly structured following the present invention, the connector and the pipe body can be easily and firmly fixed. Furthermore, since the coil spring is not provided unlike the conventional needle assembly, it is possible to suppress the increase in the number of parts and the number of assembling steps, and hence to improve the production efficiency.

BRIEF DESCRIPTION OF THE DRAWINGS

FIG. 8 is a vertical cross sectional view showing a state of the indwelling needle assembly shown in FIG. 6 in which an inner needle is pulled out from an outer needle and a needle tip of the inner needle is housed in a protector, while a cap body of an outer needle unit is pushed in.

EMBODIMENTS FOR CARRYING OUT THE INVENTION

Hereinafter, practical embodiments of the present invention will be described with reference to the drawings.

Figure 1:
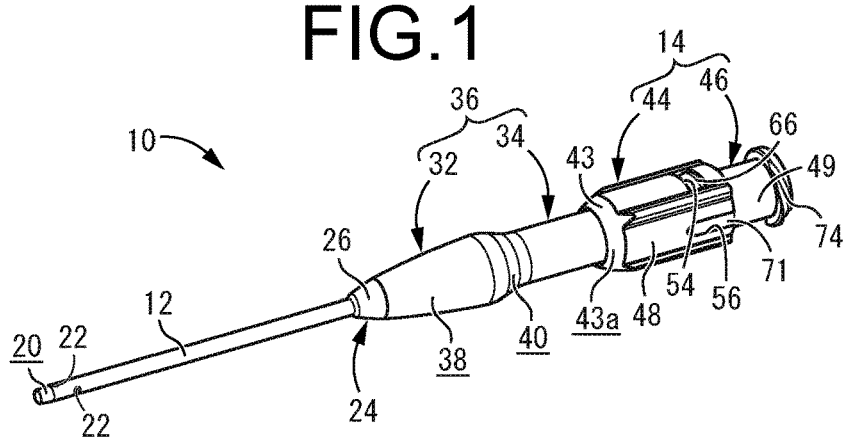
FIG. 1 is a perspective view showing a valved needle assembly according to a first practical embodiment of the present invention.
Figure 2:
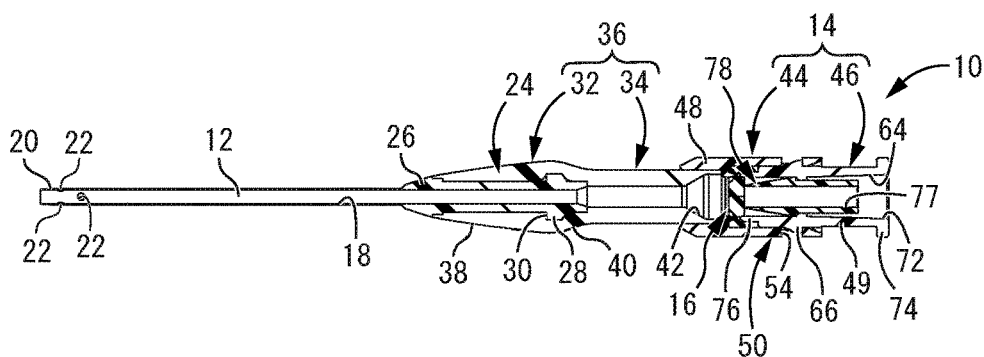
FIG. 2 is a vertical cross sectional view of the valved needle assembly shown in FIG. 1.
Figure 3:
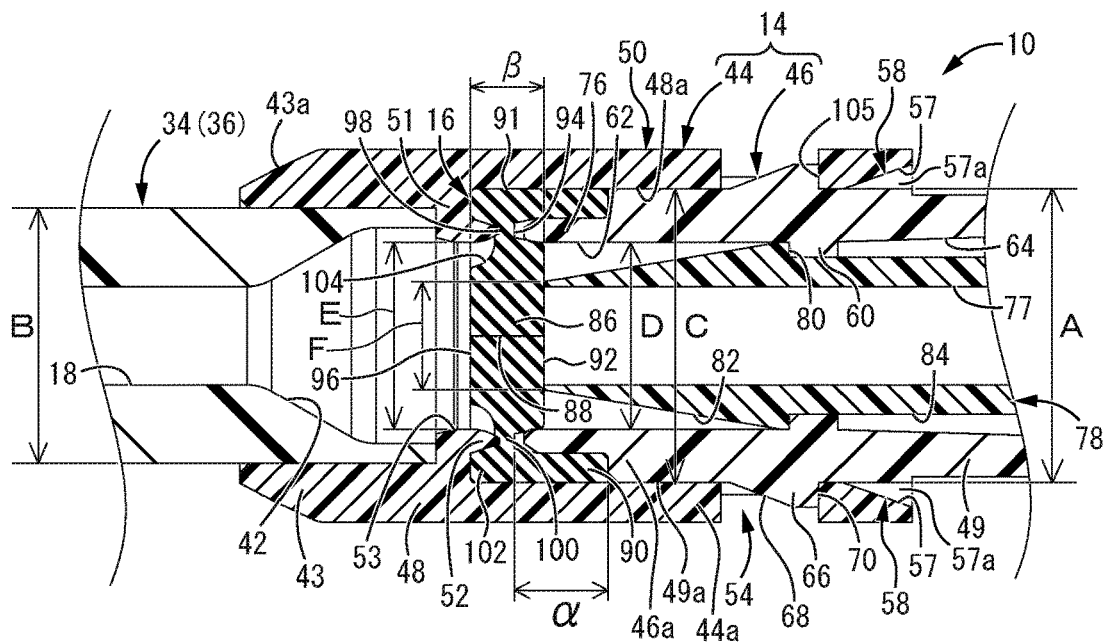
FIG. 3 is an enlarged cross sectional view of a principal part in FIG. 2.

First, FIGS. 1 through 3 depict a valved needle assembly 10 according to a first practical embodiment of the present invention. The valved needle assembly 10 includes a hollow needle 12, and on the base end side of the hollow needle 12, provided is a connection hub 14 to which an external flow path is connected. Inside the connection hub 14, a disc valve 16 serving as a valve body is housed. A fluid flow path 18 from the blood vessel to the external flow path is constituted by including the inside of the hollow needle 12 and the connection hub 14. By the valved needle assembly 10 being stuck into the blood vessel and indwelled therein, infusion or blood collection is configured to be performed through the fluid flow path 18. Meanwhile, accompanying connection and removal of the external flow path with respect to the connection hub 14, opening and closing of the disc valve 16, that is, communication and blocking of the fluid flow path 18 are configured to be switched. In the following description, the axial direction refers to the direction of the central axis of each member, which substantially corresponds to the needle axis direction of the hollow needle 12, as well as refers to the lateral direction in FIG. 2 which is the lengthwise direction. In addition, the tip end side and the distal end side refer to the left side in FIG. 2, which is the sticking side of the hollow needle 12. Meanwhile, the base end side and the proximal end side refer to the right side in FIG. 2, which is the operating side of the user.

Described more specifically, in the present practical embodiment, the hollow needle 12 is formed of a soft synthetic resin, and the outer circumferential surface of the tip end portion has a tapered outer circumferential surface 20 whose outside diameter dimension gradually decreases toward the tip end side. In addition, a plurality of through holes 22 are formed in the peripheral wall of the tip end portion of the hollow needle 12, and blood or the like readily flows into the hollow needle 12 through the through holes 22.

On the other hand, on the base end portion of the hollow needle 12, formed is a fixing part 24 having a larger diameter than the other portions. That is, the tip end portion and the base end portion of the fixing part 24 are provided with an annular tip-end large-diameter part 26 and a base-end large-diameter part 28 respectively, where the outside diameter dimension thereof is made large. Besides, between the tip-end and base-end large-diameter parts 26, 28 in the axial direction, formed is an annular concave part 30 having a smaller diameter than the tip-end and base-end large-diameter parts 26, 28. The annular concave part 30 is formed continuously about the entire circumference in the circumferential direction and has a predetermined axial dimension.

The base end portion of the hollow needle 12 is fixedly supported by a needle hub 32. The needle hub 32 may be integrally formed with a tube 34 provided on the base end side of the needle hub 32. That is, the tip end side of an elastic tube 36 formed of a soft synthetic resin may comprise the needle hub 32, while the base end side of the elastic tube 36 may comprise the tube 34. In the case in which the tube 34 is a clamp tube or the like, it is also possible to place the fluid flow path 18 in a blocked state by closing the clamp tube.

The elastic tube 36, in the isolated state before the hollow needle 12 is fixed, has a generally round tubular shape extending in the axial direction with the inside diameter dimension and the outside diameter dimension that are substantially constant. The inside diameter dimension in the isolated state is made smaller than the outside diameter dimension of the fixing part 24 of the hollow needle 12. Then, the base end portion of the hollow needle 12 is press-fitted from the tip end opening part of the elastic tube 36, and subjected to treatment such as bonding or welding as necessary, whereby the hollow needle 12 is fixedly supported by the elastic tube 36. That is, the tip end portion of the elastic tube 36 is inserted in the annular concave part 30 of the fixing part 24 of the hollow needle 12, and the tip end portion of the elastic tube 36 constitutes the needle hub 32.

In the elastic tube 36, a portion positioned on the outer circumference of the base-end large-diameter part 28 of the hollow needle 12 is deformed to be expanded radially outward, and the outer circumferential surface of the needle hub 32 comprises a tapered outer circumferential surface 38 whose outside diameter dimension gradually increases from the tip end side to the base end side. Besides, the outer circumferential surface from the base end of the needle hub 32 to the tip end of the tube 34 comprises a reverse tapered outer circumferential surface 40 whose outside diameter dimension gradually decreases from the tip end side to the base end side. That is, the elastic tube 36 is formed of a soft synthetic resin and the outer circumferential surface thereof is formed with a smooth curved surface. Accordingly, when the valved needle assembly 10 is fixed on the skin of the patient by winding a tape around the elastic tube 36, for example, the risk of the patient feeling pain due to the elastic tube 36 being in contact with the skin strongly or for a long time is reduced.

Furthermore, a tapered surface 42 whose inside diameter dimension gradually increases toward the base end side is provided at the base end portion on the inner circumferential surface of the tube 34. Accordingly, a deformation-allowing region at the time of elastic deformation of the disc valve 16 described later can be sufficiently obtained.

The base end portion of the elastic tube 36 is fixed to the tip end portion of the connection hub 14. The connection hub 14 has a substantially tubular shape overall. The base end portion of the elastic tube 36 is inserted from the tip end opening part of the connection hub 14, and by performing bonding or welding processing as needed, the elastic tube 36 and the connection hub 14 are connected. That is, the tip end portion of the connection hub 14 serves as a tube connecting part 43 to which the elastic tube 36 is connected. The outer circumferential surface of the tip end portion of the tube connecting part 43 comprises a tapered surface 43*a* whose outside diameter dimension gradually decreases toward the tip end side, and when the valved needle assembly 10 is fixed on the skin of a patient or the like, the possibility that the patient feels pain due to the corner contacting the patient's skin is reduced.

Accordingly, the inner holes of the hollow needle 12, the elastic tube 36 (particularly the tube 34), and the connection hub 14 (particularly a pusher 78 described later provided inside the connection hub 14) constitute the fluid flow path 18.

The connection hub 14 has a shape in which a connector cover 44 serving as a pipe body and a guide connector 46 serving as a connector, both having a substantially round tubular shape, are connected and fixed to each other in the axial direction. Specifically, by the tip end side of the guide connector 46 being inserted into the base end side of the connector cover 44 and attached thereto, the connector cover 44 is fixed to the tip end part of the guide connector 46 to constitute the connection hub 14, and the peripheral wall of the connection hub 14 is constituted by a peripheral wall 48 of the connector cover 44 and a peripheral wall 49 of the guide connector 46. Therefore, the tip end portion of the connector cover 44 serves as the above-described tube connecting part 43. Besides, the tip end side of the guide connector 46 inserted in the connector cover 44 comprises an insertion part 46*a* of substantially round tubular shape. Meanwhile, the base end side of the connector cover 44 in which the insertion part 46*a* of the guide connector 46 is inserted comprises an insertion target part 44*a* of substantially round tubular shape.

The base end of the guide connector 46 extends further to the base end side than the connector cover 44 with a predetermined axial dimension. Therefore, the peripheral wall of the connection hub 14 is formed such that the connecting portion between the connector cover 44 and the guide connector 46 includes an assembly part 50 having a double-walled structure in which the insertion part 46*a* is internally disposed within the insertion target part 44*a*. Meanwhile, the peripheral wall on the tip end side of the connection hub 14 is constituted by the peripheral wall 48 of the connector cover 44, and the peripheral wall on the base end side of the connection hub 14 is constituted by the peripheral wall 49 of the guide connector 46. Thus, in the portion where the connector cover 44 and the guide connector 46 are connected to each other to form the double-walled structure (the assembly part 50), an inner circumferential surface 48*a* of the peripheral wall 48 of the connector cover 44 and an outer circumferential surface 49*a* of the peripheral wall 49 of the guide connector 46 serve as the superposed faces of the connector cover 44 and the guide connector 46.

The connector cover 44 is made of a rigid synthetic resin and includes the tubular peripheral wall 48. In the peripheral wall 48, the inside diameter dimension and the outside diameter dimension are made generally constant across roughly the entire length in the axial direction. Moreover, an annular wall part 51 is formed on an inner circumferential surface of the peripheral wall 48 in the axially middle portion so as to protrude radially inward. Besides, an annular support part 52 that protrudes toward the base end side is provided to the radially inside end of the annular wall part 51. The annular support part 52 has a cross-sectional shape that gradually tapers toward the protruding tip end side (base end side). Furthermore, the inner circumferential surface of the annular support part 52 is constituted by a curved convex surface 53 which is convex radially inward.

At the base end portion of the inner circumferential surface 48*a* of the peripheral wall 48 of the connector cover 44, a pair of engaging holes 54, 54 that open to the radial inside are formed on both sides in one diametrical direction (both sides in the vertical direction in FIG. 2), and in the present practical embodiment, these engaging holes 54, 54 are formed so as to penetrate the peripheral wall 48 in the thickness direction. Each of the engaging holes 54, 54 has a substantially rectangular shape in plan view, and is formed circumferentially partially with a circumferential dimension less than half the circumference. Further, in the peripheral wall 48 of the connector cover 44, in a position away from the pair of engaging holes 54, 54 in the circumferential direction, formed is a notch part 56 extending from the opening edge on the axial end (base end) toward the axial inside (tip side). In the present practical embodiment, a pair of the notch parts 56, 56 are formed with a predetermined width dimension on both sides in the direction orthogonal to the direction of opposition of the pair of engaging holes 54, 54 (on both sides in the front-rear direction of the paper surface in FIG. 2).

Moreover, at the base end of the inner circumferential surface 48*a* of the peripheral wall 48 of the connector cover 44, a pair of inclined guide surfaces 57, 57 are provided in the same direction as the direction of opposition of the engaging holes 54, 54 (both sides in the vertical direction in FIG. 2), so that the thickness dimension of the peripheral wall 48 gradually decreases toward the base end side. Specifically, on the inner circumferential surface 48*a* of the connector cover 44, each of the inclined guide surfaces 57, 57 gradually expands toward the base end, that is, the tip end in the direction of assembly described later. Accordingly, the inclined guide surfaces 57, 57 and both side wall parts 57*a*, 57*a* sandwiching the inclined guide surfaces 57, 57 provide a pair of guide grooves 58, 58 opening radially inward at the base end of the inner circumferential surface 48*a* of the peripheral wall 48 of the connector cover 44. In other words, the groove bottom faces of the respective guide grooves 58, 58 serve as the inclined guide surfaces 57, 57.

Meanwhile, the guide connector 46 is formed of a rigid synthetic resin and includes the peripheral wall 49 having a smaller diameter than the peripheral wall 48 of the connector cover 44. In this peripheral wall 49, the inside diameter dimension and the outside diameter dimension are made generally constant across roughly the entire length in the axial direction. In the present practical embodiment, the outside diameter dimension A of the peripheral wall 49 (see FIG. 3) is made larger than the outside diameter dimension B of the tube 34 (see FIG. 3), while being made roughly equal to the inside diameter dimension C of the peripheral wall 48 of the connector cover 44 (see FIG. 3). Besides, the inside diameter dimension D of the peripheral wall 49 (see FIG. 3) is made roughly equal to the minimum inside diameter dimension E of the curved convex surface 53 in the annular support part 52 of the connector cover 44 (see FIG. 3).

An annular engaging wall part 60 is formed on an inner circumferential surface of the peripheral wall 49 in the axially middle portion so as to protrude radially inward. In the peripheral wall 49, the inner circumferential surface on the tip end side of the engaging wall part 60 comprises a guide surface 62 for guiding axial movement of a pusher 78 described later, and its inside diameter dimension is substantially constant. On the other hand, the inner circumferential surface on the base end side of the engaging wall part 60 comprises a tapered surface 64 whose inside diameter dimension gradually increases toward the base end side.

In the axially middle portion of the outer circumferential surface 49a of the peripheral wall 49, a pair of locking protrusions 66, 66 are formed so as to protrude from both sides in one diametrical direction (both sides in the vertical direction in FIG. 2). The shape of the locking protrusions 66, 66 in plan view is a substantially rectangular shape corresponding to the engaging holes 54, 54 of the connector cover 44, and is formed circumferentially partially. Besides, the tip end faces of the locking protrusions 66, 66 comprise inclined surfaces 68, 68 in which the protruding height of the locking protrusions 66, 66 gradually decrease toward the tip end side, that is, the protruding dimension of the locking protrusions 66, 66 gradually increase from the front toward the back in the direction of insertion described later. Meanwhile, the base end faces of the locking protrusions 66, 66 comprise vertical surfaces 70, 70 spreading in the axis-perpendicular direction. The inclination direction of the inclined surfaces 68, 68 of the locking protrusions 66, 66 with respect to the axial direction is made equal to the inclination direction of the inclined guide surfaces 57, 57 of the guide grooves 58, 58 with respect to the axial direction. In the present practical embodiment, the inclination angles of the both surfaces 57, 68 with respect to the axial direction are also made substantially equal, and the inclined surface 68 and the inclined guide surface 57 are substantially parallel to each other in the axial direction.

Moreover, on the outer circumferential surface of the peripheral wall 49, on both sides in the direction orthogonal to the direction of opposition of the pair of locking protrusions 66, 66 (on both sides in the front-rear direction of the paper surface in FIG. 2), a pair of positioning protrusions 71, 71 having shapes corresponding to the notch parts 56, 56 are formed so as to protrude therefrom.

Furthermore, on the outer circumferential surface of the base end opening part 72 of the peripheral wall 49, formed is an annular connection projection 74 protruding radially outward. A screw thread is formed on the outer circumferential surface of the connection projection 74, so that at the time of connection of an external flow passage described later, it is possible to connect a luer-lock type external flow path.

Here, a support tube part 76 of tubular shape protruding toward the tip end side is provided on the tip end surface of the peripheral wall 49. The inside diameter dimension of the support tube part 76 is substantially equal to the inside diameter dimension of the peripheral wall 49, while the outside diameter dimension of the support tube part 76 is made smaller than the outside diameter dimension of the peripheral wall 49. In addition, the support tube part 76 has a cross-sectional shape that gradually tapers toward the tip end side.

A tubular pusher 78 having an inner hole 77 penetrating its center in the axial direction is housed in the radial inside of the guide connector 46 having the above-described shape. That is, the inner hole of the guide connector 46 includes the inner hole 77 of the pusher 78. The inside diameter dimension of the pusher 78 is substantially constant across substantially the entire length in the axial direction, while on the outer circumferential surface of the pusher 78, an annular stepped surface 80 extending in the axis-perpendicular direction is formed. The outer circumferential surface on the tip end side of the stepped surface 80 comprises a tapered outer circumferential surface 82 which gradually decreases in diameter toward the tip end side, while the outer circumferential surface on the base end side of the stepped surface 80 comprises a straight outer circumferential surface 84 whose outside diameter dimension is substantially constant. The maximum outside diameter dimension of the base end portion of the tapered outer circumferential surface 82 is larger than the outside diameter dimension of the straight outer circumferential surface 84. On the other hand, the minimum outside diameter dimension F of the tip end portion of the tapered outer circumferential surface 82 is smaller than the outside diameter dimension of the straight outer circumferential surface 84, as well as being smaller than the minimum inside diameter dimension E of the curved convex surface 53 of the annular support part 52 of the connector cover 44.

Here, the disc valve 16 is housed within the radial inside of the connector cover 44. The disc valve 16 has a substantially circular disk shape and is formed of a material having elasticity such as rubber or elastomer. A slit 88 penetrating in the axial direction is formed in the central portion 86 of the disc valve 16. Although the shape of the slit 88 is not limited, in the present practical embodiment, the slit 88 has a radial shape extending substantially equally to three sides in the circumferential direction. In the isolated state of the valved needle assembly 10 to which the external flow path is not connected, the disc valve 16 is supported by a radial pressing force being exerted from the radial outside to the radial inside, for example, so that the slit 88 is in a closed state.

In the outer circumferential portion of the disc valve 16, a tubular support part 90 extending to the base end side is provided. In the present practical embodiment, the outside diameter dimension of the disc valve 16 and the outside diameter dimension of the tubular support part 90 are substantially equal, and an outer circumferential surface 91 of the disc valve 16 and the outer circumferential surface of the tubular support part 90 constitute an annular surface which is flat in the axial direction. Besides, in the outer circumferential portion of a base end surface 92 of the disc valve 16, on the radial inside of the tubular support part 90, a base end concave groove 94 is formed so as to extend continuously about the entire circumference in the circumferential direction and open to the base end side.

On the other hand, in the outer circumferential portion of a tip end surface 96 of the disc valve 16, a tip end concave groove 98 is formed so as to extend continuously about the entire circumference in the circumferential direction and open to the tip end side. In the present practical embodiment, the base end concave groove 94 and the tip end concave groove 98 are formed substantially at the same position in the radial direction of the disc valve 16, and the portion between the bottom faces of the base end concave groove 94 and the tip end concave groove 98 comprises a constricted part 100 whose thickness dimension (axial dimension) is made smaller than that of the central portion 86. Particularly, in the present practical embodiment, the thickness dimension (axial dimension) of the constricted part 100 is made smaller than the thickness dimension (axis-perpendicular dimension) of the tubular support part 90.

That is, in the disc valve 16, the radially outer side of the constricted part 100 protrudes to the base end side and the tip end side from the bottom faces of the base end concave groove 94 and the tip end concave groove 98 respectively, and the portion protruding to the base end side comprises the aforementioned tubular support part 90, while the portion protruding to the tip end side comprises a tip end tubular part 102. The tip end surface of the tip end tubular part 102 is positioned substantially at the same axial position as the tip end surface 96 of the disc valve 16, while the base end surface of the tubular support part 90 is positioned further on the base end side than the base end surface 92. Besides, in the disc valve 16, the central portion 86 where the slit 88 is formed is positioned in the radially inner portion surrounded by the constricted part 100.

Particularly, in the present practical embodiment, the axial length $\alpha$ of the tubular support part 90 (see FIG. 3) is not less than a half of the thickness dimension (axial length) $\beta$ of the central portion 86 of the disc valve 16 (see FIG. 3) ($\alpha \geq \beta/2$). By adopting such dimensions, it is possible to stably exhibit the dislodgment prevention effect of the disc valve 16, the support effect owing to the guide connector 46, or the like described later.

Furthermore, on the tip end surface 96 of the disc valve 16, on the radial inside of the tip end concave groove 98, a circumferential groove 104 is formed adjacent to the tip end concave groove 98 and extends continuously about the entire circumference in the circumferential direction. That is, the inner surface of the tip end concave groove 98 and the inner surface of the circumferential groove 104 are continuous with each other in the radial direction. The inner surface of the circumferential groove 104 and the curved convex surface 53 of the annular support part 52 of the connector cover 44 are spaced apart from each other in the radial direction to form a gap. This facilitates elastic deformation of the disc valve 16 at the time of pushing in the pusher 78 (at the time of connecting the external flow path) described later.

The connection hub 14 is constituted by the connector cover 44, the guide connector 46, the disc valve 16, and the pusher 78 which are structured as described above.

That is, the pusher 78 is inserted from the tip end opening part of the guide connector 46 and disposed therein. At that time, the base end position of the pusher 78 is determined by the engaging wall part 60 provided on the inner circumferential surface of the guide connector 46 and the stepped surface 80 provided on the outer circumferential surface of the pusher 78 abutting against each other. Further, with the pusher 78 housed, the straight outer circumferential surface 84 of the pusher 78 and the inner circumferential surface of the engaging wall part 60 are in abutment against each other or are slightly remote from each other, while the outer circumferential surface at the base end portion of the tapered outer circumferential surface 82 of the pusher 78 and the guide surface 62 of the guide connector 46 are in abutment against each other or slightly remote from each other. By so doing, the pusher 78 is movable in the axial direction while being guided by the inner circumferential surface of the guide connector 46.

At the tip end portion of the guide connector 46, the tubular support part 90 of the disc valve 16 is superposed on and supported thereby. That is, the tip end portion of the support tube part 76 provided to the tip end of the guide connector 46 is positioned within the base end concave groove 94 of the disc valve 16, and in the present practical embodiment, the tip end portion of the support tube part 76 is inserted in the base end concave groove 94. At the same time, the inner circumferential surface of the tubular support part 90 of the disc valve 16 is in abutment against the outer circumferential surface of the support tube part 76, and the tip end portion of the guide connector 46 is fitted in the base end side of the disc valve 16. Particularly, in the present practical embodiment, the inner and outer circumferential surfaces of the tip end portion of the support tube part 76 respectively abut against the inner and outer circumferential surfaces that constitute the inner surface of the base end concave groove 94. Besides, a gap is formed between the tip end surface of the support tube part 76 and the bottom face of the base end concave groove 94 in the axial direction, thereby improving ease of elastic deformation of the disc valve 16 at the time of moving the pusher 78 described later as well as improving durability of the disc valve 16. With the disc valve 16 supported in such a way, the tip end of the pusher 78 abuts against the base end surface 92 of the disc valve 16, so that the pusher 78 is positioned axially between the disc valve 16 and the engaging wall part 60.

The connector cover 44 is assembled from the tip end side of the disc valve 16. That is, with the disc valve 16 superposed on and supported by the tip end, the tip end portion of the guide connector 46 is inserted from the base end opening part of the connector cover 44, and the locking protrusions 66, 66 of the guide connector 46 are engaged with the engaging holes 54, 54, so that the connector cover 44 and the guide connector 46 are coaxially connected in series in the axial direction. Specifically, by the vertical surfaces 70, 70, which are the base end faces of the locking protrusions 66, 66, abutting against base end inner faces 105, 105 of the engaging holes 54, 54, the insertion part 46a of the guide connector 46 is prevented from dislodgment from the insertion target part 44a of the connector cover 44. Accordingly, the base end inner faces 105, 105 of the engaging holes 54, 54 constitute a locking part for locking the locking protrusions 66, 66. That is, in the present practical embodiment, the locking part (base end inner faces 105, 105) is provided further on the tip end side than the guide grooves 58, 58 (inclined guide surfaces 57, 57), namely, at the back side of the connector cover 44 in the direction of assembly described later so as to be positioned overlapping the guide grooves 58, 58 on the inner circumferential surface 48a of the peripheral wall 48 of the connector cover 44 on the extension line in the axial direction. In other words, for the connector cover 44 provided with the locking part (base end inner faces 105, 105), the direction from the tip end side to the base end side refers to the direction of assembly as described later, and the guide grooves 58, 58 (inclined guide surfaces 57, 57) are provided on the tip end portion in the direction of assembly of the connector cover 44 (base end portion in the axial direction). That is, the guide grooves 58, 58 extend from the tip end portion in the direction of assembly of the connector cover 44 toward the locking part (base end inner faces 105, 105).

In the above description, the assembly of the connector cover 44 and the guide connector 46 is realized by inserting the guide connector 46 into the connector cover 44. That is, the direction in which the connector cover 44 and the guide connector 46 approach each other refers to the direction of assembly, and for the connector cover 44, the direction from the tip end side to the base end side means the direction of assembly, whereas for the guide connector 46, the direction from the base end side to the tip end side means the direction of assembly. In the present practical embodiment, since the guide connector 46 is inserted into the connector cover 44, with respect to the directions of assembly mentioned above, especially the direction of assembly of the guide connector 46 (direction from the base end side to the tip end side) refers to the direction of insertion. However, the direction of insertion is not limited to this way. As will be described later in the second practical embodiment or in the preferred practical embodiment shown in FIG. 16, the pipe body positioned on the tip end side (outer needle cap 216 or connector cover 292) may be inserted into the connector positioned on the base end side (cap connector 218 or guide connector 294). In this case, the direction of assembly of the pipe body means the direction of insertion, which is the direction from the tip end side to the base end side.

When inserting the guide connector 46 into the connector cover 44, by the locking protrusions 66, 66 of the guide connector 46 being inserted into the guide grooves 58, 58 of the connector cover 44, and by the positioning protrusions 71, 71 of the guide connector 46 being inserted into the notch parts 56, 56 of the connector cover 44, the locking protrusions 66, 66 and the engaging holes 54, 54 can be easily positioned in the circumferential direction. Besides, by the inclined guide surfaces 57, 57 which are the groove bottom faces of the guide grooves 58, 58 and the inclined surfaces 68, 68 of the locking protrusions 66, 66 abutting against each other, the locking protrusions 66, 66 are guided by the inclined guide surfaces 57, 57 of the guide grooves 58, 58, so as to be easily locked with the engaging holes 54, 54 positioned on the tip end side of the guide grooves 58, 58.

In the assembled state of the connector cover 44, the outer circumferential portion of the disc valve 16 is positioned and held in the axial direction and in the axis-perpendicular direction between the connector cover 44 and the guide connector 46 assembled with each other, so as to be incorporated in a mated state by being mated with the connector cover 44 and the guide connector 46. In particular, the protruding tip end portion of the annular support part 52 of the connector cover 44 is positioned within the tip end concave groove 98 of the disc valve 16, and in the present practical embodiment, the protruding tip end portion of the annular support part 52 is inserted in the tip end concave groove 98. At the same time, the inner and outer circumferential surfaces of the tip end tubular part 102 of the disc valve 16 respectively abut against the outer circumferential surface of the annular support part 52 and the inner circumferential surface of the peripheral wall 48 of the connector cover 44. That is, the annular support part 52 of the connector cover 44 is fitted in the tip end side of the disc valve 16, and furthermore, the tip end tubular part 102 of the disc valve 16 is superposed on and supported by the outer circumferential surface of the annular support part 52. Particularly, in the present practical embodiment, the tip end tubular part 102 is pressed and sandwiched radially between the outer circumferential surface of the annular support part 52 and the inner circumferential surface 48*a* of the peripheral wall 48 of the connector cover 44. In the present practical embodiment, the inner and outer circumferential surfaces of the annular support part 52 respectively abut against the inner and outer circumferential surfaces that constitute the inner surface of the tip end concave groove 98.

Moreover, the outer circumferential surface 91 of the disc valve 16 and the outer circumferential surface of the tubular support part 90 are in abutment against the inner circumferential surface 48*a* of the peripheral wall 48 of the connector cover 44. In the isolated state before attachment of the disc valve 16, the outside diameter dimension of the disc valve 16 is slightly larger than the inside diameter dimension of the connector cover 44, and by the disc valve 16 being attached between the connector cover 44 and the guide connector 46, the outer circumferential surface 91 of the disc valve 16 is pressed radially inward (toward the axis center) by the inner circumferential surface 48*a* of the peripheral wall 48 of the connector cover 44. That is, the inner circumferential surface 48*a* of the peripheral wall 48 of the connector cover 44 constitutes a pressing part that presses the disc valve 16 radially inward. In the present practical embodiment, the pressing part (inner circumferential surface 48*a* of the peripheral wall 48) comprises a flat annular surface.

Further, in the isolated state of the disc valve 16, the thickness dimension (axis-perpendicular dimension) of the tubular support part 90 is slightly larger than the radial distance between the support tube part 76 of the guide connector 46 and the peripheral wall 48 of the connector cover 44. That is, in the assembled state of the disc valve 16, the tubular support part 90 is sandwiched and pressed between the support tube part 76 and the peripheral wall 48 of the connector cover 44 in the thickness direction (radial direction). By so doing, the disc valve 16 is more stably supported between the connector cover 44 and the guide connector 46. The outer circumferential portion of the disc valve 16 may be sandwiched by the connector cover 44 and the guide connector 46 in a compressed state in the axial direction as well.

By assembling the connector cover 44, the guide connector 46, the disc valve 16, and the pusher 78 with their tip end sides facing upward, dislodgment of the disc valve 16 from the guide connector 46 at the time of assembly may effectively be prevented. However, the assembling method is not limited to this one.

By connecting the above-described hollow needle 12, elastic tube 36, and connection hub 14 in the axial direction, the valved needle assembly 10 of the present practical embodiment is constituted. The valved needle assembly 10 is used as a valved indwelling needle assembly by, for example, an inner needle unit (not shown) including an inner needle having a needle tip is inserted into an outer needle unit including the valved needle assembly 10. Specifically, by sticking the valved indwelling needle assembly into the patient's blood vessel and pulling out the inner needle unit from the outer needle unit, the valved needle assembly 10 is indwelled in the patient's blood vessel. Although the specific structure of such an inner needle unit is not limited at all, specific examples of the indwelling needle assemblies are shown in FIGS. 6 to 13 described later. However, by the hollow needle 12 being made as a needle of metal or the like having a needle tip, it is also possible to stick the valved needle assembly 10 directly into the blood vessel of the patient to be indwelled therein.

Figure 4:
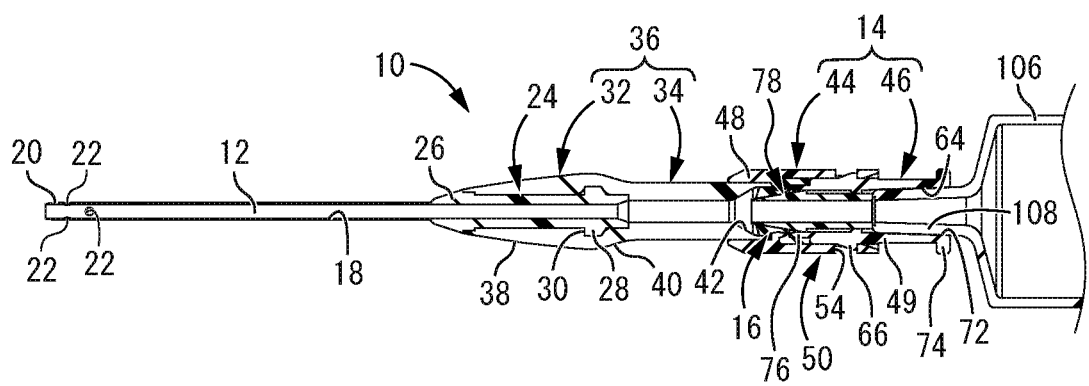
FIG. 4 is a vertical cross sectional view showing a state in which an external flow path is connected to the valved needle assembly shown in FIG. 1, corresponding to FIG. 2.
Figure 5:
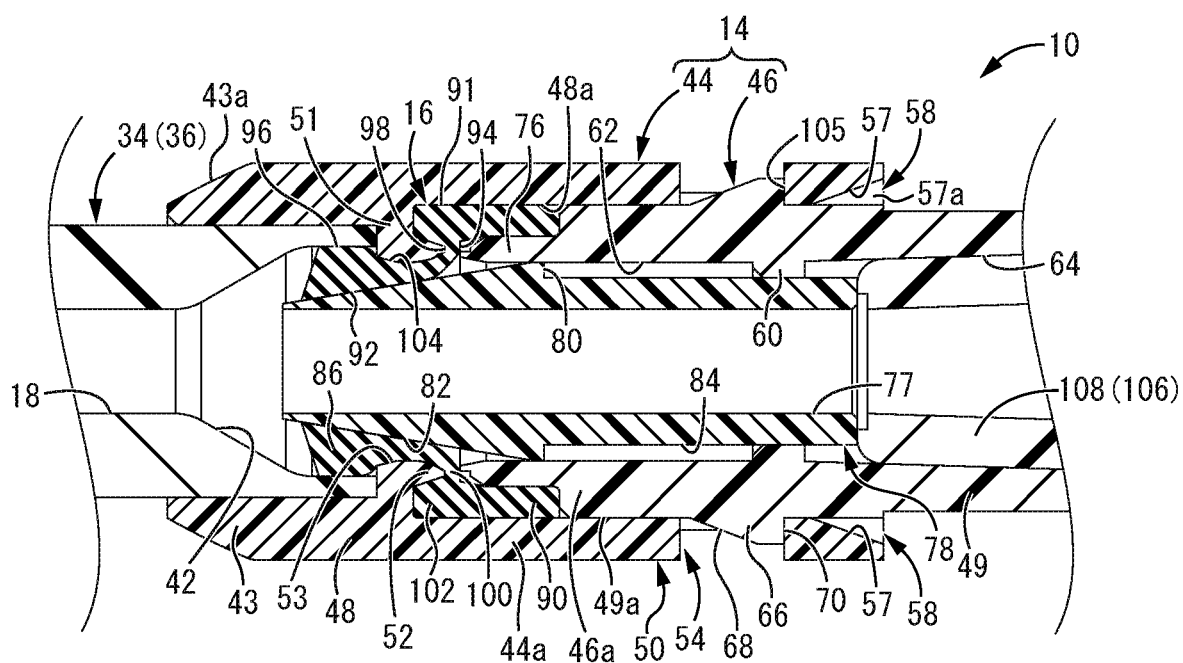
FIG. 5 is an enlarged cross sectional view of a principal part in FIG. 4.

Then, as depicted in FIGS. 4 and 5, a syringe 106 serving as an external flow path is inserted and connected from the base end side of the valved needle assembly 10 indwelled in the patient's blood vessel, so that the blood vessel of the patient and the external flow path (syringe) 106 communicate with each other via the fluid flow path 18.

That is, by inserting a male luer 108 of the syringe 106 from the base end opening part 72 of the connection hub 14 (guide connector 46), the pusher 78 housed inside the guide connector 46 is moved to the tip end side by the tip end of the male luer 108. By so doing, the tip end of the pusher 78 is pressed against the base end surface 92 of the disc valve 16, and elastically deforms the disc valve 16 so as to open the slit 88 of the disc valve 16.

At that time, the disc valve 16 is elastically deformed as shown in FIG. 5 or the like. That is, the radially inner side of the constricted part 100 (central portion 86) is elastically deformed by the tip end of the pusher 78 so as to be pulled toward the tip end side. During such elastic deformation, the inner surface of the circumferential groove 104 provided on the tip end surface 96 of the disc valve 16 is configured to abut against substantially the entire curved convex surface 53 of the annular support part 52 provided on the connector cover 44. This may effectively prevent blood from entering between the disc valve 16 and the connector cover 44 during the elastic deformation of the disc valve 16. Furthermore, when the external flow path (syringe) 106 is removed, which will be described later, elastic recovery force of the disc valve 16 can be further exhibited. In addition, in the present practical embodiment, the tip end surface 96 of the central portion 86 of the disc valve 16 is configured to abut against the inner circumferential surface of the base end opening part of the elastic tube 36.

In the opened state of the slit 88 of the disc valve 16, since the fluid flow path 18 is placed in a communicating state, infusion or blood collection can be performed through the fluid flow path 18.

Also, after the treatment or at the time of interruption of infusion or blood collection, by removing the syringe 106 from the connection hub 14 (guide connector 46), the disc valve 16 recovers to the shape before connection of the syringe 106 (shape in FIG. 3 or the like) by its inherent elastic recovering action, so that the slit 88 is closed (namely, the fluid flow path 18 is brought into a blocked state). At that time, the pusher 78 is pushed back and moved to the base end side by the central portion 86 of the disc valve 16, and the moving end of the pusher 78 toward the base end side is determined by the stepped surface 80 of the pusher 78 abutting against the engaging wall part 60 provided to the inner circumferential surface of the guide connector 46. Thus, when the external flow path (syringe) 106 is removed, the pusher 78 can be positioned at a predetermined position.

In the valved needle assembly 10 structured as described above, one of the connector cover 44 and the guide connector 46 is inserted into the other, and the locking protrusions 66, 66 provided to the guide connector 46 is locked with the engaging holes 54, 54 provided to the peripheral wall 48 of the connector cover 44, so that the connector cover 44 and the guide connector 46 are mutually assembled so as to constitute the connection hub 14. That is, since no adhesive or the like is used at the time of assembling the connector cover 44 and the guide connector 46, the adhesive will not leak into the fluid flow path 18 or the like, as well as the bonding step is omitted. Thus, it is possible to improve the production efficiency of the connection hub 14 and hence the valved needle assembly 10.

Moreover, the guide grooves 58, 58 are provided on the base end sides of the engaging holes 54, 54, and by inserting the locking protrusions 66, 66 into the guide grooves 58, 58, the locking protrusions 66, 66 are guided more reliably to the engaging holes 54, 54. Thus, not only are the connector cover 44 and the guide connector 46 positioned with respect to each other in the circumferential direction, but also the connector cover 44 and the guide connector 46 are smoothly assembled, thereby further improving the production efficiency of the valved needle assembly 10.

Particularly, the connector cover 44 is provided with the notch parts 56, 56, while the guide connector 46 is provided with the positioning protrusions 71, 71. By the positioning protrusions 71, 71 being inserted into the notch parts 56, 56, the circumferential positions of the connector cover 44 and the guide connector 46 can be effectively positioned. Therefore, engagement between the engaging holes 54, 54 and the locking protrusions 66, 66 as described above can be stably realized. In addition, since the notch parts 56, 56 are provided to the peripheral wall 48 of the base end portion of the connector cover 44, the peripheral wall 48 of the connector cover 44 readily flexes when the guide connector 46 is inserted into the connector cover 44. This may even further facilitate the assembly of the connector cover 44 and the guide connector 46.

Further, unlike the needle assembly of the conventional structure, a separate coil spring or the like is not used due to the closing deformation of the disc valve. Thus, the insertion resistance of the syringe 106 can be reduced, and increases in the number of parts and the number of assembling steps can be suppressed, as well as an increase in the size of the valved needle assembly 10 can also be avoided.

Furthermore, with the valved needle assembly 10 of the present practical embodiment, when the external flow passage (syringe) 106 is inserted, the central portion 86 of the disc valve 16 is pulled toward the tip end side and elastically deformed. Here, since the tubular support part 90 extending toward the base end side is provided to the outer circumferential portion of the disc valve 16, it is possible to effectively prevent dislodgment of the disc valve 16 from the connection hub 14. Particularly, since the tubular support part 90 is sandwiched radially between the support tube part 76 of the guide connector 46 and the peripheral wall 48 of the connector cover 44 in a pressed state, the dislodgment of the disc valve 16 from the connection hub 14 can be more effectively prevented.

In this way, since the force for supporting the disc valve 16 is exhibited particularly by the tubular support part 90, in comparison with a case where, for example, the disc valve has a simple flat-plate shape, the radial compressive force and the like by the connection hub 14 can also be made small or substantially zero. By so doing, the central portion 86 of the disc valve 16 can easily undergo elastic deformation, and the insertion resistance of the external flow path (syringe) 106 is reduced. In addition, the tubular support part 90 provided at the outer circumferential edge of the disc valve 16 is sandwiched between the support tube part 76 and the peripheral wall 48. Accordingly, even when pressed by the pusher 78, elastic deformation of the outer circumferential edge of the disc valve 16 is suppressed, thereby more advantageously exhibiting elastic recovery force of the disc valve 16 to the initial shape at the time of removal of the syringe 106.

Besides, the connection hub 14 includes the guide connector 46 for guiding axial movement of the pusher 78. Thus, in comparison with a case where, for example, a member for guiding the pusher 78 is formed separately from the connection hub 14 and housed in the radial inside of the connection hub 14, it is possible to obtain a larger outside diameter dimension of the guide connector 46, and hence the disc valve 16 superposed on the tip end portion of the guide connector 46. Accordingly, it is possible to sufficiently ensure the rubber volume of the disc valve 16, so that durability and reliability can be improved, for example. In addition, the opening of the slit 88 can be enlarged as well, and elastic deformation of the disc valve 16 due to the pusher 78 can be facilitated.

Furthermore, the tip end concave groove 98 and the base end concave groove 94 are respectively provided to the tip end surface 96 and the base end surface 92 of the disc valve 16, and the annular support part 52 of the connector cover 44 and the support tube part 76 of the guide connector 46 are inserted in these concave grooves 98, 94. Thus, a force for retaining the disc valve 16 by the connection hub 14 can be stably improved. Furthermore, the distance between the opposed annular support part 52 and support tube part 76 in the axial direction is made smaller than the plate thickness dimension of the tubular support part 90. This will effectively prevent the tubular support part 90 from slipping out from between the annular support part 52 and the support tube part 76, thereby even more effectively preventing the dislodgment of the disc valve 16 from the connection hub 14.

Figure 6:
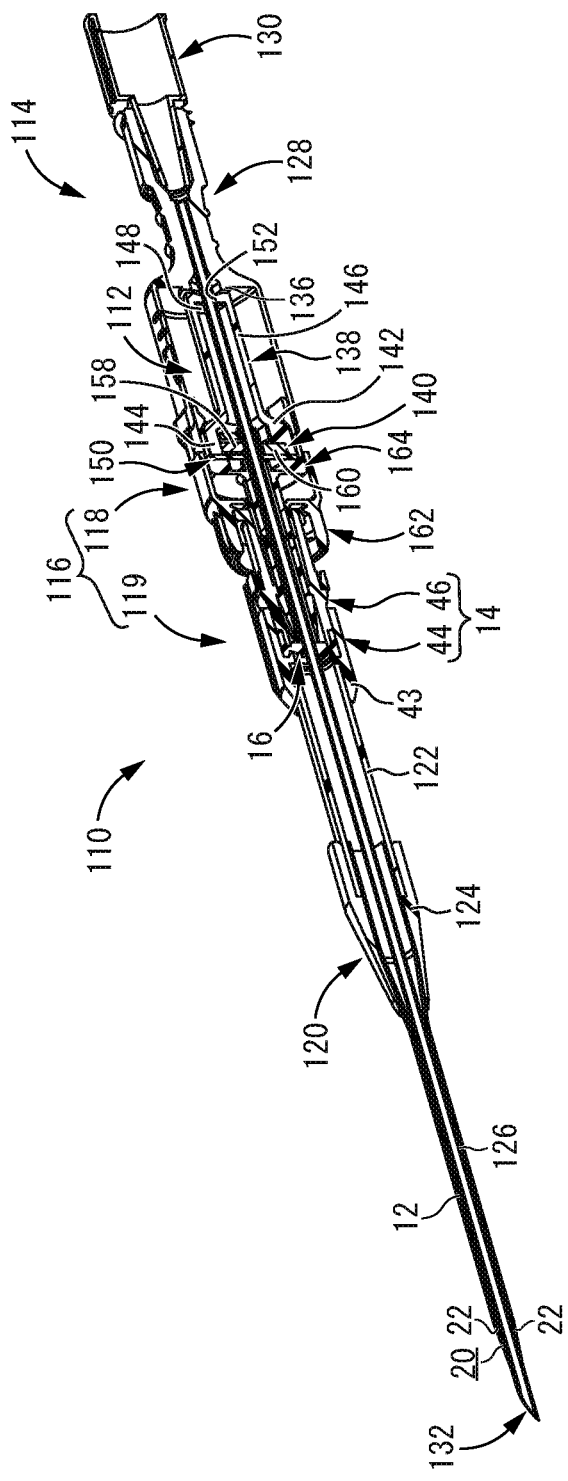
FIG. 6 is a vertical cross sectional perspective view showing a specific example of an indwelling needle assembly including the valved needle assembly according to the present invention.
Figure 7:
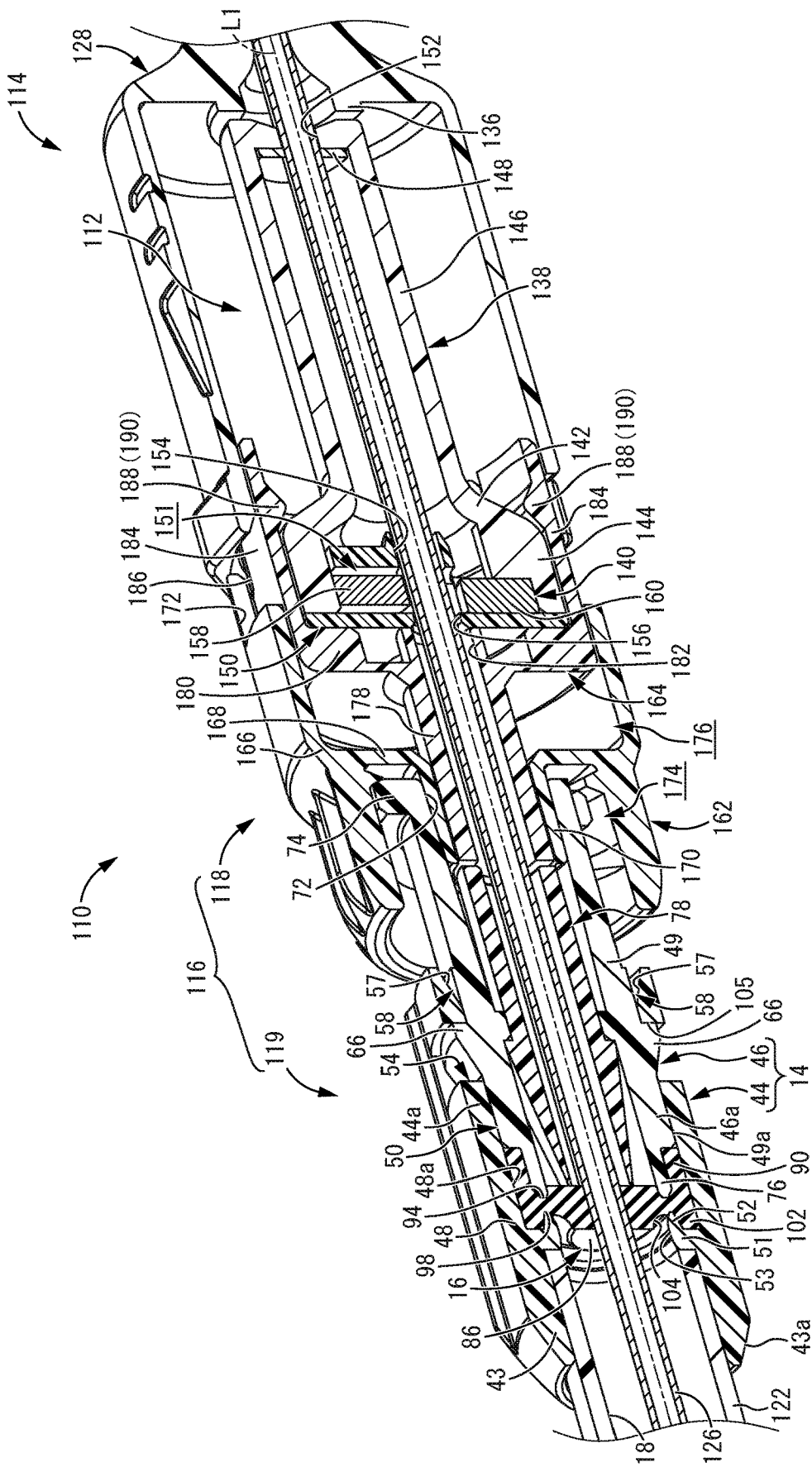
FIG. 7 is an enlarged cross sectional view of a principal part in FIG. 6.

The valved needle assembly according to the present invention as described above serves as an entire or a part of an outer needle unit, for example, and is combined with an inner needle unit so as to be used as an indwelling needle assembly. Specifically, FIGS. 6 and 7 depict a specific example of the indwelling needle assembly according to the present invention. In the following description, components and parts that are substantially identical with those of the valved needle assembly 10 previously shown in FIGS. 1 to 5 will be assigned the same reference numerals as in FIGS. 1 to 5 and not described in any detail.

That is, an indwelling needle assembly 110 shown in FIGS. 6 and 7 is configured to extend in the needle axis direction along the predetermined axis L1, and comprises an inner needle unit 114 including a protector 112, an outer needle unit 116, and a connection cap 118 for connecting the inner needle unit 114 and the outer needle unit 116. The outer needle unit 116 of the present practical embodiment includes a valved needle assembly 119, which has substantially the same structure as the valved needle assembly 10 shown in FIGS. 1 to 5, and the connection cap 118.

The valved needle assembly 119 in the indwelling needle assembly 110 is different from the valved needle assembly 10 shown in FIGS. 1 to 5 in that a needle hub and a tube connected to the base end side of the needle hub are formed as separate components. The hollow needle 12 serving as an outer needle is fixedly supported by an outer needle hub 120 made of a rigid synthetic resin, and a tube 122 made of a soft synthetic resin extends from the base end side of the outer needle hub 120. Specifically, the outer needle hub 120 includes a substantially tubular peripheral wall 124, and the hollow needle 12 is inserted from the tip end opening part of the peripheral wall 124 and fixed to the inner circumferential surface of the peripheral wall 124. Meanwhile, the tip end of the tube 122 is sandwiched between the hollow needle 12 and the peripheral wall 124 at the base end opening part of the outer needle hub 120, and is subjected to treatment such as bonding or welding as necessary, whereby the tube 122 is connected to the base end opening part of the outer needle hub 120.

On the other hand, the inner needle unit 114 includes an inner needle 126, an inner needle hub 128, and an inner needle cap 130 in addition to the protector 112. The inner needle 126 is a generally round tubular hollow needle made of a metallic material or a rigid synthetic resin, for example, and extends straightly along the axis L1. The inner needle 126 has a sharp needle tip 132 at its distal side end, and the needle tip 132 is sharply formed so as to puncture a blood vessel. Furthermore, on the outer circumferential surface of the inner needle 126, two protruding parts 134, 134 (see FIG. 8) are formed near the needle tip 132. The two protruding parts 134, 134 protrude from the outer circumferential surface of the inner needle 126 outward in the radial directions that are the mutually opposite directions. The protruding part 134 may be provided over the entire circumference in the circumferential direction. Also, the inner needle 126 may be a solid needle. The inner needle hub 128 is provided at the proximal side end of the inner needle 126.

The inner needle hub 128 is formed in a generally cylindrical shape, and its middle portion is constricted in comparison with the proximal side portion and the distal side portion. The proximal end portion of the inner needle 126 is inserted through the inner hole of the middle portion and fixed by an adhesive or the like. Furthermore, a distal side opening and a proximal side opening are respectively formed in the distal end and the proximal end of the inner needle hub 128, and in the center of the bottom wall of the distal side opening, formed is a ceiling 136 protruding to the distal side. On the other hand, the inner needle cap 130 is fitted in the proximal side opening of the inner needle hub 128, and the proximal side opening is blocked by the inner needle cap 130. Furthermore, the distal side portion of the inner needle hub 128 is made larger in diameter than the remaining portions (i.e., the middle portion and the proximal side portion), and within the distal side portion of the inner needle hub 128, housed is a portion of each of a luer cap 164 and the protector 112 described later in detail. The inner needle 126 of the inner needle unit 114 constituted in this way is inserted into the outer needle unit 116.

A ventilation filter (not shown) is provided inside the inner needle cap 130, and the ventilation filter has a property of transmitting gases but blocking liquids. By the inner needle cap 130 being attached to the inner needle hub 128, the proximal side opening of the inner needle hub 128 is liquid-tightly covered, so that the blood return through the inner needle 126 does not leak out to the outside. Further, by the inner needle hub 128 and the inner needle cap 130 being made of a transparent member, confirmation of blood return (flashback) can be easily performed.

The protector 112 is a member for housing and protecting the needle tip 132 of the inner needle 126, and includes a casing 138 and a shutter mechanism 140. The casing 138 is a roughly hollow cylindrical member made of a synthetic resin. The casing 138 has a tapered portion 142 in its middle portion, and the tapered portion 142 is tapered so as to gradually increase in diameter as it goes toward the distal side. Accordingly, in the casing 138, a large-diameter part 144 including the tapered portion 142 is formed on the distal side, and a small-diameter part 146 is formed on the proximal side. An annular ring member 148 is provided at the proximal end in the casing 138. On the other hand, the distal side opening part of the casing 138 (distal side opening part of the large-diameter part 144) is closed by a lid body 150 having a substantially flat-plate shape overall being attached thereto. In this way, the distal side opening of the large-diameter part 144 is closed by the lid body 150, so that the space surrounded by the large-diameter part 144 including the tapered portion 142 and the lid body 150 serves as a housing space 151.

In the casing 138, the inner needle 126 is inserted movably in the needle axis direction with the needle tip 132 protruded. That is, a base end insertion hole 152 is formed around the axis L1 at the proximal end of the casing 138, while an intermediate insertion hole 154 and a tip end insertion hole 156 are formed in the lid body 150, so that the inner needle 126 is inserted through each of the insertion holes 152, 154, 156. The inner needle 126 is inserted through the ring member 148 as well.

Here, the two protruding parts 134, 134 of the inner needle 126 are configured to be capable of passing through the intermediate insertion hole 154 and the tip end insertion hole 156 on the distal side, but to be engaged with the ring member 148. Therefore, when the inner needle 126 is moved relative to the protector 112 (that is, when the inner needle 126 is pulled out from the protector 112), the two protruding parts 134, 134 are configured to pass through the intermediate insertion hole 154 and the tip end insertion hole 156 on the distal side and to be housed within the protector 112, and subsequently to be engaged with the ring member 148 to stay in the protector 112. Further, in the inner needle 126, the positions of the protruding parts 134, 134 are adjusted such that when the protruding parts 134, 134 are engaged with the ring member 148, the needle tip 132 is housed within the protector 112. In this way, within the protector 112, in order to prevent the needle tip 132 housed therein from protruding out from the protector 112, the shutter mechanism 140 is housed in the large-diameter part 144 and axially between the intermediate insertion hole 154 and the tip end insertion hole 156.

The shutter mechanism 140 includes a shielding member 158 and a fixing member 160. That is, one of the shielding member 158 and the fixing member 160 comprises a magnet, and the other comprises a ferromagnetic material such as a magnet or iron, and mutual magnetic attracting force is exerted thereon. The shielding member 158 and the fixing member 160 are arranged in opposition to each other in the radial direction. The fixing member 160 is fixed to the lid body 150, and the shielding member 158 is provided within the lid body 150 so as to be movable toward the fixing member 160. By the lid body 150 being fixed to the distal side opening part of the casing 138, the shielding member 158 and the fixing member 160 are housed within the housing space 151 in the large-diameter part 144 of the casing 138.

More specifically, the inner needle 126 is inserted between the shielding member 158 and the fixing member 160 in a state before use as shown in FIGS. 6 and 7, whereby the shielding member 158 and the fixing member 160 are arranged with a gap therebetween. On the other hand, when the inner needle 126 is pulled out to the proximal side with respect to the protector 112 and its needle tip 132 is housed in the casing 138, the following action starts. That is, the shielding member 158 is attracted by the fixing member 160 and adsorbed on the fixing member 160. Accordingly, the shielding member 158 is disposed on the axis L1 within the casing 138, that is, between the needle tip 132 and the tip end insertion hole 156, and in a state where the needle tip 132 is located within the housing space 151, the tip end insertion hole 156 which is the opening on the tip end side of the housing space 151 is closed. By closing the tip end insertion hole 156 in this way, the needle tip 132 is housed within the protector 112 so as to be unable to escape therefrom, so that the needle tip 132 is protected by the protector 112. When the inner needle 126 is further moved to the proximal side with the needle tip 132 housed in this way, the protector 112 moves relatively to the luer cap 164 described later together with the inner needle 126.

The base end of the inner needle 126 having the structure as described above is inserted into the inner needle hub 128 and is fixedly supported by the inner needle hub 128 by being subjected to treatment such as bonding or welding as necessary. In addition, the protector 112 is externally mounted about the inner needle 126 movably in the axial direction. By so doing, the inner needle unit 114 of the present practical embodiment is provided. In the initial state shown in FIGS. 6 and 7, the inner needle 126 protruding to the tip end side of the inner needle unit 114 is inserted from the base end opening part of the valved needle assembly 119, that is, the base end opening part 72 of the guide connector 46, and is further inserted through the disc valve 16, the tube 122, the outer needle hub 120 and the hollow needle 12 from the base end side, so that the needle tip 132 of the inner needle 126 projects from the tip end of the hollow needle 12. Accordingly, the inner needle unit 114 and the valved needle assembly 119 are mutually assembled.

Here, the connection cap 118 is provided between the guide connector 46 of the valved needle assembly 119 and the protector 112 of the inner needle unit 114, and the connection cap 118 connects the outer needle unit 116 and the inner needle unit 114 to each other. That is, the base end portion (proximal side portion) of the outer needle unit 116 is constituted by the connection cap 118, and the protector 112 is connected to the connection cap 118. The connection cap 118 includes an outer needle cap 162 and a luer cap 164 serving as a cap body, both of which have a substantially tubular shape.

The outer needle cap 162 is a generally cylindrical member made of a rigid synthetic resin or the like. The outer needle cap 162 has a step 166 at the axially middle portion of the outer circumferential surface thereof, and the distal side portion of the step 166 is made smaller in diameter than the proximal side portion thereof. At the distal side portion of the outer needle cap 162, the proximal end portion of the guide connector 46 is inserted and screwed therewith, and the outer needle cap 162 is detachably provided further to the proximal side than the outer needle hub 120, in the present practical embodiment, at the proximal end portion of the guide connector 46.

Further, on the inner circumferential surface of the outer needle cap 162, an inward flange 168 is formed at an axially middle portion thereof (more specifically, a position substantially corresponding to the step 166). The inward flange 168 is formed on the inner circumferential surface of the outer needle cap 162 over the entire circumference in the circumferential direction, and projects radially inward from the inner circumferential surface. Additionally, an insertion cylindrical part 170 is formed on the inner circumferential edge part of the inward flange 168. The insertion cylindrical part 170 has a generally round tubular shape and protrudes from the inner circumferential edge part of the inward flange 168 to the distal side. The outside diameter dimension of the insertion cylindrical part 170 is substantially equal to the inside diameter dimension of the guide connector 46, and the insertion cylindrical part 170 is configured to be inserted into the guide connector 46 with the outer needle cap 162 screwed with the guide connector 46.

Moreover, at the proximal side opening part of the outer needle cap 162, a pair of notches 172, 172 are formed on both sides in one diametrical direction (both sides in the vertical direction in FIGS. 6 and 7) so as to open to the proximal side and penetrate the outer needle cap 162 in the thickness direction (radial direction). The notches 172, 172 have a substantially rectangular shape in plan view, and are formed with a predetermined circumferential dimension.

The inner hole of the outer needle cap 162 is separated by the inward flange 168 into a distal region 174 and a proximal region 176. In the distal region 174, the proximal end of the guide connector 46 is inserted as described above. On the other hand, in the proximal region 176, a portion of the distal side of the luer cap 164 is inserted. That is, in the connection cap 118, the outer needle cap 162 and the luer cap 164 are provided in series in the axial direction, and the most proximal side portion of the outer needle unit 116 is constituted by the luer cap 164 serving as a cap body.

The luer cap 164 is a generally round tubular member made of a rigid synthetic resin or the like, and includes a pushing part 178 and a housing part 180. The pushing part 178 is made smaller in diameter than the housing part 180, and the outside diameter dimension of the pushing part 178 is substantially the same as the inside diameter dimension of the insertion cylindrical part 170 of the outer needle cap 162. The pushing part 178 is inserted through the insertion cylindrical part 170, and the distal end of the pushing part 178 is opposed to the proximal end of the pusher 78 provided in the guide connector 46. The pushing part 178 arranged in this way is made longer than the insertion cylindrical part 170 in the needle axis direction, and the housing part 180 is integrally provided to the proximal side portion of the pushing part 178.

The housing part 180 has a generally tubular shape with a bottom, and the outside diameter dimension thereof is substantially the same as the hole diameter dimension of the proximal region 176 of the outer needle cap 162. The housing part 180 having such a shape is inserted in the proximal region 176, and is provided on the proximal side of the connection cap 118. More specifically, since the pushing part 178 is made longer than the insertion cylindrical part 170, the housing part 180 is disposed so as to be remote from the inward flange 168 to the proximal side (that is, at the reference position). Therefore, the luer cap 164 can be pushed in further to the distal side from this reference position, and by pushing in the luer cap 164, the slit 88 of the disc valve 16 is pushed open by the pusher 78, thereby placing the fluid flow path 18 in a communicating state.

In addition, a through hole 182 is formed around the central axis of the housing part 180. The through hole 182 communicates with the inner hole of the pushing part 178. The inner needle 126 is inserted through the through hole 182 and the inner hole of the pushing part 178 so as to be relatively movable in the needle axis direction, and the needle tip 132 protrudes to the distal side of the hollow needle 12. On the other hand, the proximal end of the housing part 180 protrudes from the proximal end of the outer needle cap 162 to the proximal side. Also, the distal end of the inner needle hub 128 is opposed to the proximal end of the outer needle cap 162, and the proximal end portion of the housing part 180 is inserted into the inner needle hub 128. The protector 112 is inserted into the housing part 180 of the luer cap 164 configured in this way.

Figure 11:
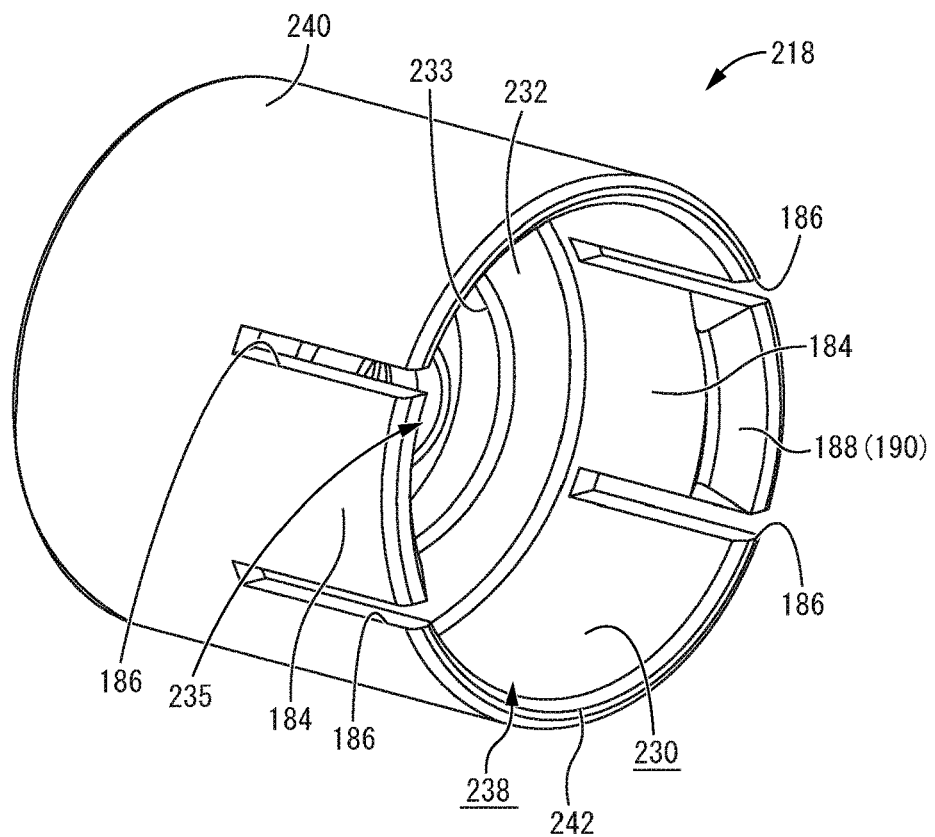
FIG. 11 is an enlarged perspective view of a connector constituting the valved needle assembly shown in FIG. 9.

The housing part 180 of the luer cap 164 includes a plurality of flexible pieces 184, 184 (a pair of flexible pieces 184, 184 in the present practical embodiment), and the pair of flexible pieces 184, 184 are spaced from each other at approximately equal intervals in the circumferential direction (that is, at an interval of about 180 degrees). That is, in the present practical embodiment, a pair of flexible pieces 184, 184 are formed on both sides in one diametrical direction (both sides in the vertical direction in FIGS. 6 and 7) at the proximal side opening part of the housing part 180. Each of the flexible pieces 184 is formed by a pair of notched grooves 186, 186 as shown in FIG. 7, FIG. 11 described later, and the like. That is, the pair of notched grooves 186, 186 are formed on the outer circumferential surface of the housing part 180 so as to be spaced from each other in the circumferential direction. Also, the pair of notched grooves 186, 186 penetrate the housing part 180 in the radial direction, and extend from the proximal end of the housing part 180 to the axially middle portion in the needle axis direction. The pair of notched grooves 186, 186 are formed in this way, so that the plate-shaped flexible piece 184 is formed therebetween.

The flexible pieces 184 formed in this way are capable of flexing outward in the radial direction, and on the inner circumferential surface of each flexible piece 184 (that is, the inner circumferential surface of the housing part 180), formed is a convex engaging portion 188. That is, the housing part 180 of the luer cap 164 includes a pair of the convex engaging portions 188, 188 on the inner circumferential part thereof, and an engaging part 190 is constituted by including the pair of convex engaging portions 188, 188. Besides, the pair of convex engaging portions 188, 188 are arranged in opposition to each other in the radial direction.

The convex engaging portion 188 protrudes radially inward from the inner circumferential surface of the flexible piece 184 and extends from one end to the other end of the flexible piece 184 in the circumferential direction. Furthermore, as shown in FIGS. 6 and 7, the convex engaging portion 188 is formed to have a mountain-shaped cross section when viewed by cutting with an imaginary plane including the axis L1. With the protector 112 housed in the luer cap 164, the convex engaging portion 188 having such a shape is positioned so as to correspond to the tapered portion 142 of the casing 138 of the protector 112 (that is, at the radial outside of the tapered portion 142 of the casing 138). Accordingly, the convex engaging portion 188 engages with the large-diameter part 144 (more specifically, the tapered portion 142), and the protector 112 and the luer cap 164 can be held in a connected state. That is, in the present practical embodiment, an engaging target part engaged with the engaging part 190 is constituted by the large-diameter part 144 including the tapered portion 142 that is provided on the outer circumferential part of the casing 138.

With respect to the protector 112 housed in this way, the small-diameter part 146 of the casing 138 protrudes from the interior of the luer cap 164 into the inner needle hub 128, and the proximal side portion of the small-diameter part 146 of the casing 138 is housed within the inner needle hub 128. In the present practical embodiment, the proximal end of the casing 138 is in contact with the ceiling 136 provided to the inner needle hub 128. With this arrangement, the protector 112 is sandwiched between the ceiling 136 and the bottom face of the housing part 180, and movement of the protector 112 is restricted. On the other hand, by moving the inner needle hub 128 to the proximal side away from the luer cap 164, the protector 112 can be pulled out and moved from the luer cap 164 in the needle axis direction.

That is, when moving the inner needle hub 128 and pulling out the protector 112 from the luer cap 164, since the convex engaging portion 188 has a mountain shape in cross section, the convex engaging portion 188 is pushed radially outward by the large-diameter part 144. In association therewith, the pair of flexible pieces 184, 184 flex radially outward, making it possible to increase the spacing between the pair of convex engaging portions 188, 188. By so doing, the engagement between the pair of convex engaging portions 188, 188 and the large-diameter part 144 is released, so that the protector 112 can be detached (that is, pulled out) from the luer cap 164. Also, since the convex engaging portion 188 has a mountain shape in cross section, when the protector 112 is inserted into the luer cap 164 as well, the convex engaging portion 188 is pushed radially outward by the large-diameter part 144 so that the pair of flexible pieces 184, 184 flex radially outward. This increases the radial spacing between the pair of convex engaging portions 188, 188, and the protector 112 can smoothly enter the luer cap 164.

In addition, the luer cap 164 is inserted into the outer needle cap 162 as described above. Here, the notches 172, 172 are formed on the outer circumferential surface of the outer needle cap 162 at positions respectively corresponding to the pair of flexible pieces 184, 184. The notches 172, 172 extend further to the distal side than the pair of flexible pieces 184, 184 of the luer cap 164 positioned at the reference position. With this configuration, the pair of flexible pieces 184, 184 can be flexed without hitting the outer needle cap 162, so that the protector 112 can be smoothly attached to and detached from the luer cap 164.

On the other hand, in use or the like, the proximal end part of the luer cap 164 is inserted into and covered by the inner needle hub 128. That is, the pair of flexible pieces 184, 184 are covered by the inner needle hub 128 from the radial outside. This prevents the pair of flexible pieces 184, 184 from being flexed radially outward to be pushed open.

Figure 8:
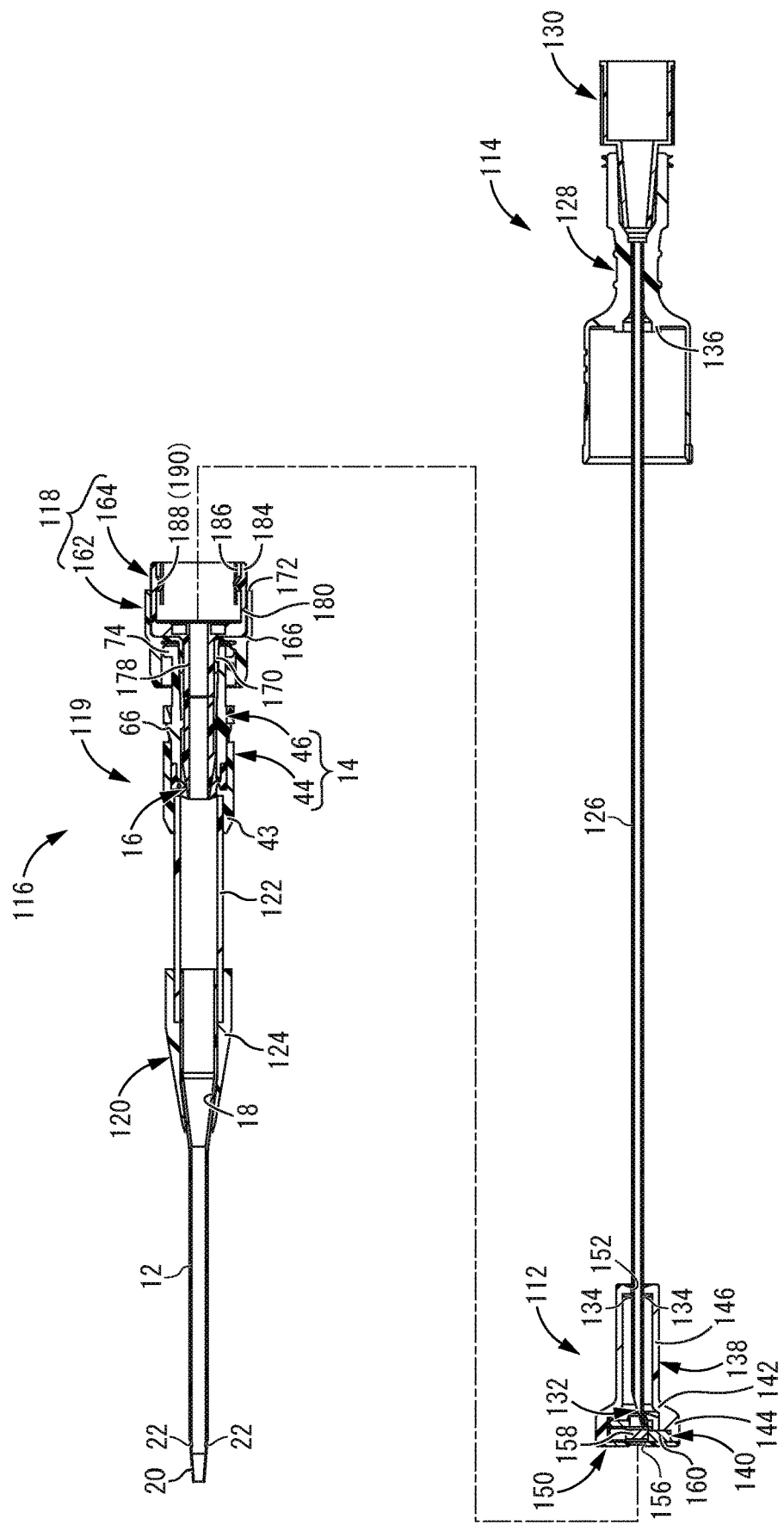

In the indwelling needle assembly 110 constituted as described above, as shown in FIGS. 6 and 7, the inner needle 126 is inserted through the protector 112 and the outer needle unit 116 (connection cap 118 and valved needle assembly 119), and the needle tip 132 protrudes from the hollow needle 12. The indwelling needle assembly 110 is used in blood purification therapy such as artificial dialysis in this state. Described more specifically, the indwelling needle assembly 110 is stuck into the blood vessel of the patient with the blade face of the needle tip 132 facing upward, and is pushed until the distal side portion of the hollow needle 12 enters the blood vessel of the patient. Subsequently, the inner needle unit 114 is withdrawn from the outer needle unit 116 in order to pour the infusion liquid such as dialysate into the blood vessel. That is, the user grips the inner needle hub 128 and moves it to the proximal side relative to the outer needle unit 116. Then, the needle tip 132 of the inner needle 126 is eventually housed in the hollow needle 12 and further reaches the protector 112 through the hollow needle 12, the outer needle hub 120, the disc valve 16, the pusher 78, and the connection cap 118. By so doing, as shown in FIG. 8, the needle tip 132 is housed within the protector 112, whereby the shutter mechanism 140 closes the tip end insertion hole 156, and the needle tip 132 is protected by the protector 112.

While being protected, the protruding parts 134, 134 of the inner needle 126 are engaged with the ring member 148 in the protector 112, and the protector 112 moves integrally with the inner needle 126. On the other hand, the protector 112 is engaged with the luer cap 164 and held in a connected state, and the movement of the protector 112 toward the proximal side is restricted. By pulling the inner needle unit 114 further to the proximal side with a predetermined load, the pair of convex engaging portions 188, 188 are pushed by the protector 112 and the pair of flexible pieces 184, 184 are opened. Accordingly, the engagement is released, and the protector 112 is detached from the luer cap 164. When the engagement is released, the pair of convex engaging portions 188, 188 rides on a portion of the large-diameter part 144 of the protector 112 excluding the tapered portion 142, and the protector 112 is allowed to move freely toward the proximal side.

That is, the pulling force required to move the protector 112 to the proximal side before and after the disengagement is configured to suddenly change, and this sudden change is given to the user as a sense of clicking of the protector 112. The larger the rate of change is, that is, the larger the engaging force is, the more appropriately the sense of clicking can be transmitted to the user. On the other hand, if the engaging force is increased, it is difficult to pull out the protector 112 from the luer cap 164. With the indwelling needle assembly 110, as described above, the luer cap 164 and the protector 112 are physically connected by engaging the pair of convex engaging portions 188, 188 and the large-diameter part 144. Thus, by changing the shape of the convex engaging portion 188 and the shape of the large-diameter part 144, it is possible to more appropriately transmit the sense of clicking to the user, as well as to adjust the engaging force so as to have an appropriate engaging force. The length of the convex engaging portion 188 in the direction crossing the axis (that is, the protruding dimension) is preferably from 0.1 to 3 mm. If it exceeds this range, there is a possibility that an appropriate sense of clicking cannot be obtained.

When the protector 112 engaged with such a proper engaging force is detached from the luer cap 164, the outer needle unit 116 (connection cap 118 and valved needle assembly 119) is indwelled in the patient's blood vessel. In this state, by pushing the luer cap 164 to the distal side, the pusher 78 is pressed against the disc valve 16 in association therewith, and the slit 88 of the disc valve 16 is pushed open. Accordingly, the fluid flow path 18 provided inside the valved needle assembly 119 communicates with the external space through the inner hole of the connection cap 118, that is, the inner hole of the pushing part 178 and the through hole 182 of the housing part 180. As a result, blood flows backward within the fluid flow path 18, and the air remaining in the fluid flow path 18 is pushed out by the blood so as to be discharged to the outside through the through hole 182 of the housing part 180. By performing such an operation, the air remaining in the fluid flow path 18 is effectively discharged to the outside, thereby effectively preventing the air from entering the patient's body when the external flow path is connected.

Subsequently, for example, after visually confirming that blood has flowed backward to the predetermined position, the connection cap 118 is removed from the guide connector 46, whereby the valved needle assembly 119 is indwelled in the blood vessel of the patient. By attaching an external flow path such as a connector of an artificial dialysis device or the like (not shown) or a syringe to the guide connector 46, infusion, blood collection, hemodialysis or the like can be carried out. When the connection cap 118 is removed from the guide connector 46, the tube 122 may be closed with a clamp or the like.

The indwelling needle assembly 110 constituted as described above is configured such that the luer cap 164 is engaged with the protector 112 by the engaging force according to the shape of the convex engaging portion 188, and by the protector 112 being pulled by a force greater than the engaging force, the protector 112 can be detached from the luer cap 164. In the luer cap 164, it is possible to adjust the engaging force by changing the shape of the convex engaging portion 188, in the present practical embodiment, for example, the amount of projection to the radial inside, the length in the circumferential direction, the angle of inclination of the slope, and the like, whereby the force required at the time of pulling out the protector 112 from the luer cap 164 can be adjusted. When the user detaches the protector 112 from the luer cap 164, the feeling that the protector 112 is detached, that is, the sense of clicking of the protector 112 depends on the aforementioned engaging force. Therefore, by changing the shape of the convex engaging portion 188 and adjusting the engaging force between the luer cap 164 and the protector 112, it is possible to adjust the sense of clicking of the protector 112.

Moreover, in the indwelling needle assembly 110 of the present practical embodiment, the convex engaging portion 188 is formed on the flexible piece 184. By changing the length of the flexible piece 184 in the needle axis direction, it is possible to adjust the amount of flexure and the load required for the flexure of the flexible piece 184. That is, by changing the length of the flexible piece 184 in the needle axis direction as well, the engaging force between the luer cap 164 and the protector 112 can be adjusted, in particular, the engaging force can be adjusted so that the protector 112 can be easily detached from the luer cap 164. Further, by providing the notch 172 to the outer needle cap 162, the flexible piece 184 can be flexed while housing the luer cap 164 in the outer needle cap 162. This makes it possible to inhibit the indwelling needle assembly 110 from being elongated in the needle axis direction while adjusting the engaging force.

Furthermore, in the indwelling needle assembly 110 of the present practical embodiment, the pair of convex engaging portions 188, 188 are engaged with the large-diameter part 144 of the protector 112 so that the protector 112 is held within the luer cap 164. Therefore, the protector 112 and the luer cap 164 can be physically connected without providing a new member or the like to the protector 112. Accordingly, it is possible to suppress an increase in the number of components of the indwelling needle assembly 110.

Figure 9:
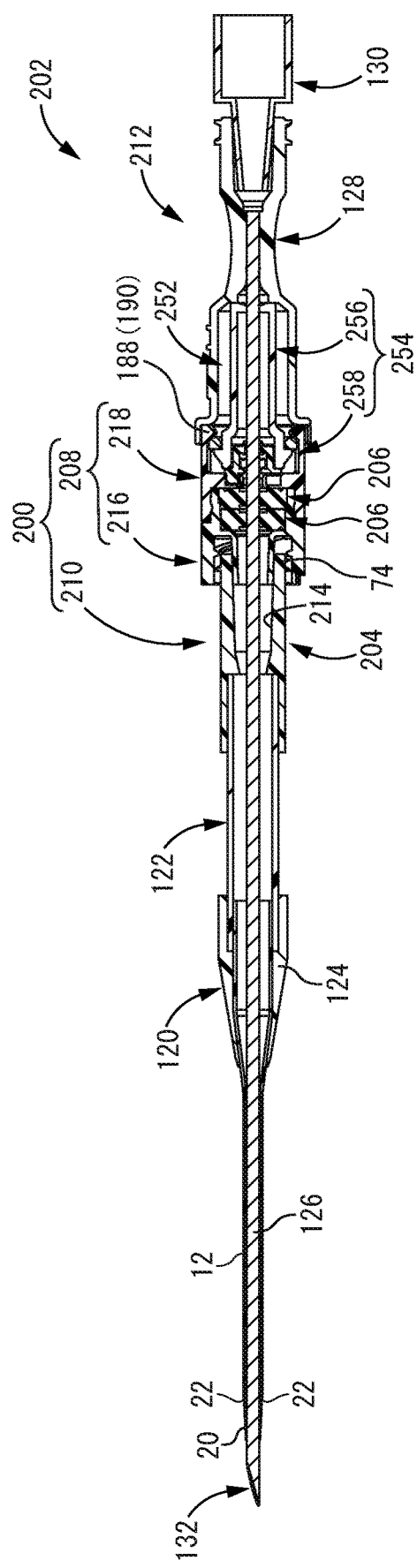
FIG. 9 is a vertical cross sectional view showing another specific example of the indwelling needle assembly including the valved needle assembly according to the present invention.
Figure 10:
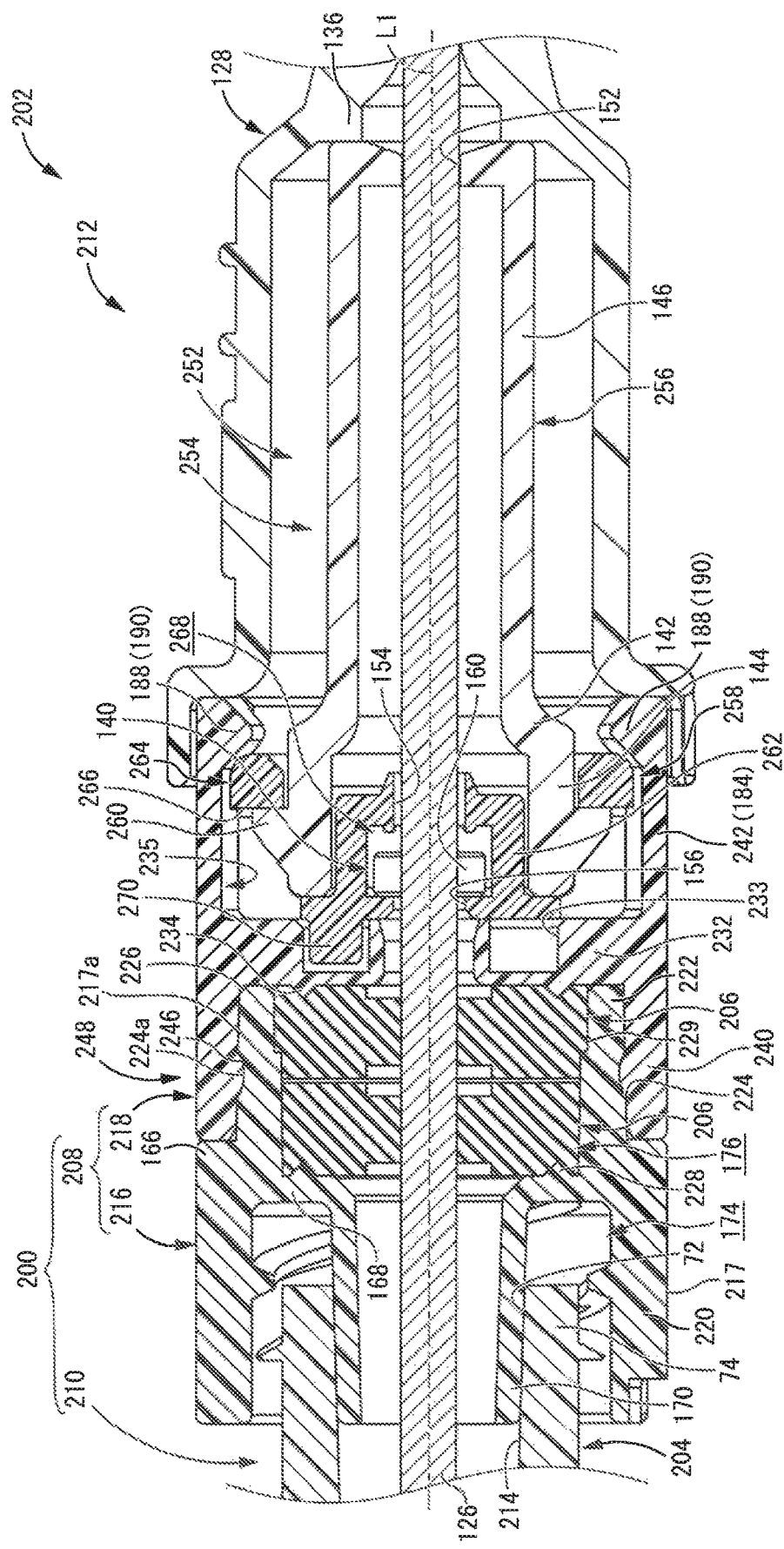
FIG. 10 is an enlarged cross sectional view of a principal part in FIG. 9.

Next, FIGS. 9 and 10 depict an indwelling needle assembly 202 comprising a valved needle assembly 200 according to a second practical embodiment of the present invention. In the preceding first practical embodiment, the connection hub 14 connected to the base end side of the tube 122 includes the pipe body (connector cover 44) and the connector (guide connector 46), and the valve body (disc valve 16) is incorporated by being mated between these connector cover 44 and guide connector 46. In the present practical embodiment, however, a connection hub 204 connected to the base end side of the tube 122 is constituted by a single component, and a disc valve 206 serving as a valve body is attached to a connection cap 208 connected to the base end side of the connection hub 204 in a mated state.

That is, in the present practical embodiment, a needle assembly 210 is constituted by including the hollow needle 12 serving as the outer needle, the outer needle hub 120, the tube 122, and the connection hub 204. Besides, the valved needle assembly 200 is constituted by a valved connection cap 208 being connected to the needle assembly 210. The valved needle assembly 200 serves as the outer needle unit, and an inner needle unit 212 is attached to the outer needle unit 200, whereby the indwelling needle assembly 202 is constituted. In the following description, components and parts that are identical with those in the preceding first practical embodiment will be assigned like symbols and not described in any detail.

The connection hub 204 of the present practical embodiment has a generally round tubular shape. The tube 122 is inserted through the distal side portion of the connection hub 204, while a female luer taper 214 is formed on the inner circumferential surface of the proximal side portion of the connection hub 204. Besides, the connection cap 208 is screwed with the outer circumferential surface of the proximal end of the connection hub 204.

The connection cap 208 according to the present practical embodiment includes an outer needle cap 216 serving as a pipe body and a cap connector 218 serving as a connector, and the outer needle cap 216 is fixed to the tip end portion of the cap connector 218. The disc valve 206 is assembled between the outer needle cap 216 and the cap connector 218 in a mated state.

The outer needle cap 216 is a generally round tubular member made of rigid synthetic resin or the like. The outer needle cap 216 includes the step 166 in the axially middle portion of its outer circumferential surface 217, and the distal side portion of the step 166 is made larger in diameter than the proximal side portion thereof. That is, in the outer needle cap 216, the tip end side (distal side) of the step 166 comprises a large-diameter tube part 220, while the base end side (proximal side) of the step 166 comprises a small-diameter tube part 222.

Here, an outer circumferential surface 217a of the small-diameter tube part 222 is provided with an engaging hole 224 opening radially outward. In the present practical embodiment, the engaging hole 224 is continuously formed over the entire circumference in the circumferential direction with a curved inner surface shape. In particular, in the present practical embodiment, the engaging hole 224 has an inner surface shape including a top 224a at the axially center portion as also shown in a vertical cross section in FIG. 10 and the like, so that the small-diameter tube part 222 has the smallest outside diameter dimension at the top 224a.

In addition, a chamfered inclined guide surface 226 is formed on the outer circumferential surface 217a of the protruding tip (axial base end) of the small-diameter tube part 222. In the present practical embodiment, the inclined guide surface 226 comprises an inclined surface that inclines in a direction such that the radial dimension of the small-diameter tube part 222 (vertical dimension in FIGS. 9 and 10) gradually increases from the base end side to the tip end side (from the front to the back in the direction of insertion described later), and is continuously formed over the entire circumference in the circumferential direction. In particular, in the present practical embodiment, the inclined guide surface 226 is a curved inclined surface that curves in an R surface shape. As will be described later, in the present practical embodiment, in the outer needle cap 216, the direction from the tip end side to the base end side refers to the direction of assembly with respect to the cap connector 218, and the engaging hole 224 is positioned at the back of the inclined guide surface 226 in the direction of assembly.

Moreover, an inward flange 168 is formed at the axially middle portion of the inner circumferential surface of the outer needle cap 216 (the position substantially corresponding to the step 166), and further, an insertion cylindrical part 170 is formed on the inner circumferential edge part of the inward flange 168. The insertion cylindrical part 170 is configured to be inserted through the connection hub 204 with the connection cap 208 (outer needle cap 216) screwed with the connection hub 204. In the present practical embodiment, on the base end face of the inward flange 168, a pressing protrusion 228 protruding to the base end side is continuously formed over the entire circumference in the circumferential direction.

Also, the inner hole of the outer needle cap 216 is separated by the inward flange 168 into the distal region 174 and the proximal region 176, that is, the region surrounded by the large-diameter tube part 220 comprises the distal region 174, while the region surrounded by the small-diameter tube part 222 comprises the proximal region 176. As described above, the proximal end of the connection hub 204 is inserted into and screwed with the distal region 174.

On the other hand, the disc valve 206 is mated with the proximal region 176, that is, the region surrounded by the small-diameter tube part 222, so that the opening of the insertion cylindrical part 170 is closed by the disc valve 206. The disc valve 206 is made of a material which is elastically deformable and through which the inner needle 126 can penetrate, for example, a synthetic rubber such as polyisoprene or a thermoplastic elastomer. In the present practical embodiment, a pair of the disc valves 206, 206 are disposed adjacent to each other in the axial direction. In the central portion of the disc valves 206, 206, the slit (88) as in the first practical embodiment may be formed or need not be formed. It is preferable that outer circumferential surfaces 229, 229 of the disc valves 206, 206 are pressed radially inward by the small-diameter tube part 222, but they need not be pressed. That is, in the present practical embodiment, it is also possible to provide a pressing part for pressing the outer circumferential surfaces 229, 229 of the disc valves 206, 206 radially inward by utilizing the small-diameter tube part 222. The cap connector 218 is externally mounted on the small-diameter tube part 222 into which the disc valves 206, 206 are fitted in this way.

Figure 12:
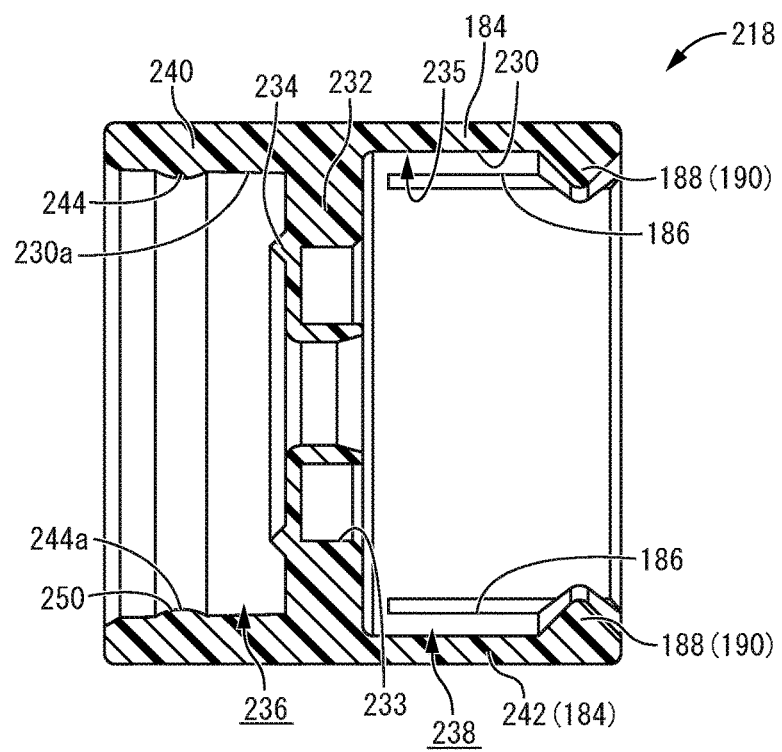
FIG. 12 is a vertical cross sectional view of the connector shown in FIG. 11.

As shown in FIGS. 11 and 12, the cap connector 218 is a generally round tubular member made of synthetic resin, and an inward flange 232 is formed at the middle portion of an inner circumferential surface 230. The inward flange 232 protrudes radially inward from the inner circumferential surface 230 of the cap connector 218, and is formed over the entire circumference of the inner circumferential surface 230 of the cap connector 218 in the circumferential direction. With this configuration, the inside diameter dimension of the cap connector 218 is made small at the position where the inward flange 232 is formed. On the base end face of the inward flange 232, a positioning concave part 233 extending in the circumferential direction with a predetermined radial width dimension is formed in the diametrically middle portion. In the present practical embodiment, the positioning concave part 233 is an annular concave part continuously extending over the entire circumference in the circumferential direction. Besides, on the tip end face of the inward flange 232, a pressing protrusion 234 protruding to the tip end side is continuously formed over the entire circumference in the circumferential direction.

An inner hole 235 of the cap connector 218 is separated into a distal region 236 and a proximal region 238 by the inward flange 232, that is, the cap connector 218 includes a tip end tubular part 240 opening to the tip end side with the inward flange 232 serving as a bottom wall, and a base end tubular part 242 opening to the base end side with the inward flange 232 serving as the bottom wall. On an inner circumferential surface 230a of the tip end tubular part 240, a locking protrusion 244 protruding radially inward is provided. In the present practical embodiment, the locking protrusion 244 has a curved outer surface that substantially corresponds to the engaging hole 224 provided in the outer circumferential surface 217a of the small-diameter tube part 222 of the outer needle cap 216, and is formed over the entire circumference in the circumferential direction. In particular, in the present practical embodiment, the locking protrusion 244 has an outer surface shape including a top 244a at the axially center portion as also shown in a vertical cross section in FIG. 12 and the like, so that the tip end tubular part 240 has the smallest inside diameter dimension at the top 244a.

Meanwhile, on the peripheral wall of the base end tubular part 242 of the cap connector 218, as in the first practical embodiment, the pair of notched grooves 186, 186 are formed so as to be spaced from each other at approximately equal intervals in the circumferential direction (that is, at an interval of about 180 degrees), and the flexible piece 184 is formed between the pair of notched grooves 186, 186. That is, a pair of the flexible pieces 184, 184 are formed on the peripheral wall of the base end tubular part 242 of the cap connector 218 at approximately equal intervals in the circumferential direction. The convex engaging portion 188 is formed at the proximal end of the inner circumferential surface of each flexible piece 184 (that is, the inner circumferential surface 230 of the cap connector 218). That is, a pair of the convex engaging portions 188, 188 are formed on the inner circumferential surface 230 of the cap connector 218, and the engaging part 190 is constituted by the pair of convex engaging portions 188, 188. The axial length of the flexible piece 184 is preferably from 0.5 to 20 mm. If the axial length of the flexible piece 184 is smaller than 0.5 mm, the flexible piece 184 finds it difficult to flex, making it difficult to attach or detach a casing 254 described later. On the other hand, if the axial length of the flexible piece 184 is greater than 20 mm, the flexible piece 184 easily flexes and there is a possibility that the casing 254 is prone to be detached.

The outer needle cap 216 is mated with the distal region 236 (tip end tubular part 240) of the cap connector 218 having such a structure. That is, the small-diameter tube part 222 of the outer needle cap 216 is inserted into the tip end tubular part 240 of the cap connector 218, and the locking protrusion 244 provided on the inner circumferential surface 230a of the tip end tubular part 240 is locked with the engaging hole 224 provided in the outer circumferential surface 217a of the small-diameter tube part 222, so that the outer needle cap 216 is fixed to the tip end part of the cap connector 218. Therefore, by the locking protrusion 244 and a base end inner face 246 of the engaging hole 224 abutting against each other, dislodgment of the outer needle cap 216 from the cap connector 218 is prevented. Accordingly, the base end inner face 246, that is, the surface on the base end side of the top 224a in the inner surface of the engaging hole 224 constitutes a locking part.

In particular, in the present practical embodiment, the tip end surface of the cap connector 218 (tip end surface of the tip end tubular part 240) abuts against the step 166 provided to the outer circumferential surface 217 of the outer needle cap 216, while the base end surface of the outer needle cap 216 (base end surface of the small-diameter tube part 222) abuts against the tip end surface of the inward flange 232 provided to the cap connector 218. Accordingly, the outer circumferential surface of the connection cap 208 is configured to have a substantially flat annular surface.

That is, in the present practical embodiment, the small-diameter tube part 222 of the outer needle cap 216 constitutes an insertion part to be inserted into the cap connector 218, while the tip end tubular part 240 of the cap connector 218 constitutes an insertion target part into which the insertion part (small-diameter tube part 222) is to be inserted. Specifically, in the connection cap 208, a portion where the insertion part (small-diameter tube part 222) is internally disposed in the insertion target part (tip end tubular part 240) comprises an assembly part 248 which is a double-walled part. Besides, the outer circumferential surface 217a of the small-diameter tube part 222 and the inner circumferential surface 230a of the tip end tubular part 240 serve as superposed faces that are overlapped with each other in the assembly part 248.

With regard to the assembly of the outer needle cap 216 and the cap connector 218, the direction in which the outer needle cap 216 and the cap connector 218 approach each other refers to the direction of assembly, and for the outer needle cap 216, the direction from the tip end side to the base end side means the direction of assembly, whereas for the cap connector 218, the direction from the base end side to the tip end side means the direction of assembly. In the present practical embodiment, since the outer needle cap 216 is inserted into the cap connector 218, with respect to the directions of assembly mentioned above, especially the direction of assembly of the outer needle cap 216 (direction from the tip end side to the base end side) refers to the direction of insertion.

That is, in the present practical embodiment, a tip end surface 250 of the locking protrusion 244, that is, the surface on the tip side from the top 244a of the locking protrusion 244 comprises an inclined surface whose protruding dimension gradually decreases from the front toward the back in the direction of insertion, and the inclination direction of the inclined surface with respect to the axial direction is equal to that of the inclined guide surface 226 provided at the protruding tip (axial base end) of the small-diameter tube part 222. In particular, the engaging hole 224 (the locking part 246) is provided at the back of the inclined guide surface 226 in the direction of assembly in the outer needle cap 216. Thus, during assembly of the outer needle cap 216 and the cap connector 218, the locking protrusion 244 is guided by the inclined guide surface 226, so as to be guided more reliably to the engaging hole 224 (the locking part 246). In the present practical embodiment, the inclination angle of the tip end surface 250 of the locking protrusion 244 with respect to the axial direction and the inclination angle of the inclined guide surface 226 with respect to the axial direction are different from each other.

By mutually assembling the outer needle cap 216 and the cap connector 218 as described above, the disc valves 206, 206 fitted in the small-diameter tube part 222 of the outer needle cap 216 are assembled in a mated state by the outer needle cap 216 and the cap connector 218. Further, the outer needle cap 216 has its proximal end (base end of the small-diameter tube part 222) abutted against the inward flange 232 of the cap connector 218, and the disc valves 206, 206 are sandwiched by the two inward flanges 168, 232. In particular, the inward flanges 168, 232 are provided with the pressing protrusions 228, 234 respectively protruding to the base end side and the tip end side, and the outer circumferential portions of the disc valves 206, 206 are compressed by these pressing protrusions 228, 234 in the axial direction. By so doing, the base end opening part of the insertion cylindrical part 170 is liquid-tightly sealed.

The inner needle unit 212 is attached to the outer needle unit (valved needle assembly) 200 having such a structure. That is, in the initial state as depicted in FIGS. 9 and 10, the inner needle 126 is inserted through the inner hole 235 of the cap connector 218, penetrates the pair of disc valves 206, 206, and through the insertion cylindrical part 170 and the needle assembly 210, the needle tip 132 of the inner needle 126 protrudes further to the tip end side than the tip end of the hollow needle 12. In the present practical embodiment, the inner needle 126 is a solid needle. A portion of a protector 252 constituting the inner needle unit 212 is inserted in the proximal region 238 (base end tubular part 242) of the cap connector 218.

The protector 252 is a member for housing and protecting the needle tip 132 of the inner needle 126, and includes a casing 254, and the shutter mechanism 140 similar to the first practical embodiment. The casing 254 is a roughly hollow cylindrical member made of a synthetic resin, and includes a casing main body 256 and a lid body 258. The casing main body 256 has a generally round tubular shape with a bottom. More specifically, the casing main body 256 has a tapered portion 142 at its middle portion, and the tapered portion 142 is tapered so as to increase its diameter toward the distal side. Thus, in the casing main body 256, the large-diameter part 144 including the tapered portion 142 is formed on the distal side, and the small-diameter part 146 is formed on the proximal side. Besides, a locking claw 260 is formed on the outer circumferential surface of the large-diameter part 144 on the distal side of the tapered portion 142. A pair of the locking claws 260 are formed on both sides in one diametrical direction (both sides in the vertical direction in FIGS. 9 and 10) on the outer circumferential surface of the large-diameter part 144, and protrude radially outward from the outer circumferential surface.

Besides, the base end insertion hole 152 is formed at the proximal end which is the bottom of the casing main body 256, and the inner needle 126 is inserted through the base end insertion hole 152. It would also be acceptable to provide the annular ring member (148) similar to the first practical embodiment in the proximal end within the casing main body 256, and to insert the inner needle 126 through the ring member (148) as well. The inner needle 126 passes through the casing main body 256, and protrudes from the opening on the distal side of the casing main body 256 toward the inner hole of the inward flange 232 of the cap connector 218 and the disc valves 206, 206. The lid body 258 is inserted into the opening on the distal side of the casing main body 256, and the opening on the distal side of the casing main body 256 is closed by the lid body 258.

That is, the lid body 258 integrally includes a central portion 262 fitted in the distal side opening part of the casing main body 256 and an external fitting part 264 fitted externally onto the distal side opening part of the casing main body 256. In the external fitting part 264, locking windows 266, 266 are formed at positions corresponding to the locking claws 260, 260 of the casing main body 256. By the locking claws 260, 260 being fitted and locked in the respective locking windows 266, 266, the lid body 258 is externally mounted in a fixed manner so as to cover the distal side opening part of the casing main body 256 (distal side opening part of the large-diameter part 144). As described above, the lid body 258 that closes the distal side opening part of the casing main body 256 (distal side opening part of the large-diameter part 144) has a hollow structure, and the space inside the lid body 258 comprises a housing space 268.

Figure 13:
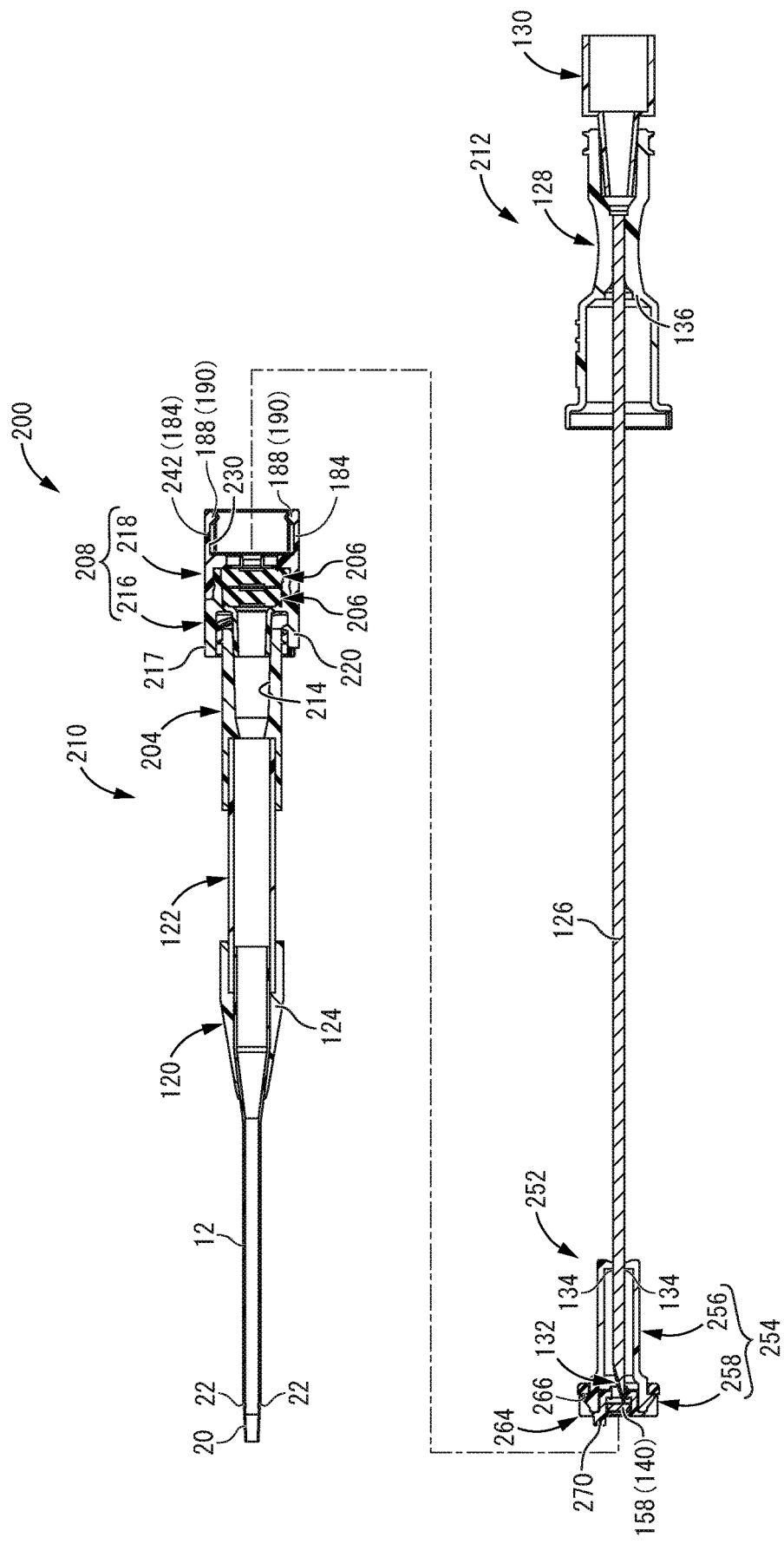
FIG. 13 is a vertical cross sectional view showing a state of the indwelling needle assembly shown in FIG. 9 in which an inner needle is pulled out from an outer needle and a needle tip of the inner needle is housed in a protector.

The lid body 258 includes the intermediate insertion hole 154 and the tip end insertion hole 156, and the inner needle 126 is inserted through both insertion holes 154, 156. Meanwhile, in the housing space 268, the shutter mechanism 140 is provided between the insertion holes 154, 156 (housing space 268). In the shutter mechanism 140, with the inner needle 126 inserted, the shielding member 158 and the fixing member 160 are remote from each other in the radial direction. When the inner needle 126 is pulled out to the proximal side and the needle tip 132 is positioned on the proximal side of the shielding member 158 and the fixing member 160, the shielding member 158 is attracted to the fixing member 160. Then, with the needle tip 132 positioned within the housing space 268, the tip end insertion hole 156, which is the opening on the tip end side of the housing space 268, is configured to be closed. Therefore, the length in the needle axis direction of the small-diameter part 146 of the casing main body 256 is set such that, as shown in FIG. 13 described later, when the protruding parts 134, 134 of the inner needle 126 are engaged with the base end portion of the small-diameter part 146 (or the ring member 148), the needle tip 132 thereof is positioned on the proximal side of the shielding member 158 and the fixing member 160.

In the present practical embodiment, a positioning convex part 270 protruding toward the tip end side is provided on the tip end surface of the lid body 258. In the initial state, the positioning convex part 270 is fitted in the positioning concave part 233 provided in the inward flange 232 of the cap connector 218, so as to position the connection cap 208 and the protector 252 in the radial direction. Thus, for example, when the inner needle 126 is pulled out, that is, when the inner needle hub 128 is moved toward the base end side with respect to the protector 252 and the protector 252 is exposed to the outside, even if an external force is exerted on the protector 252, movement of the protector 252 in the radial direction with respect to the connection cap 208 is suppressed, thereby effectively preventing unintentional release of the connection between the cap connector 218 and the protector 252.

The protector 252 constituted in this way is inserted into the proximal region 238 (base end tubular part 242) of the cap connector 218. That is, the pair of convex engaging portions 188, 188 disposed at the proximal ends of the flexible pieces 184, 184 of the cap connector 218 are configured to be engaged with the protector 252 inserted into the cap connector 218. More specifically, the pair of convex engaging portions 188, 188 are configured to be engaged with the external fitting part 264 of the lid body 258 of the protector 252, so that the protector 252 is held with respect to the cap connector 218 in a connected state. That is, in the present practical embodiment, a cap body that mutually engages with the protector 252 is constituted by the cap connector 218, and an engaging target part that is engaged with the convex engaging portions 188, 188 (engaging part 190) provided to the cap connector 218 is constituted by including the external fitting part 264 of the lid body 258.

On the other hand, when the protector 252 is pulled out, the external fitting part 264 of the lid body 258 pushes the pair of flexible pieces 184, 184 open radially outward in order to ride over the pair of convex engaging portions 188, 188. This allows the protector 252 to escape from the cap connector 218. In addition, each of the pair of convex engaging portions 188, 188 abuts against the outer circumferential edge part on the proximal side of the external fitting part 264 of the lid body 258 when engaged, and this outer circumferential edge part is R-chamfered so as to have an arcuate shape. By so doing, it is possible to inhibit the external fitting part 264 from being caught and stopping on the pair of convex engaging portions 188, 188, so that the protector 252 can be removed favorably.

The indwelling needle assembly 202 constitute in this way is used in the same manner as the indwelling needle assembly 110 of the first practical embodiment. That is, with the blade face of the needle tip 132 facing upward, indwelling needle assembly 202 is stuck into the blood vessel of the patient and pushed until the distal side portion of the hollow needle 12 enters the blood vessel of the patient. Subsequently, the inner needle unit 212 is withdrawn from the outer needle unit 200 in order to pour the infusion liquid such as dialysate into the blood vessel. As the inner needle unit 212 is withdrawn, the needle tip 132 is eventually housed in the protector 252, whereby the shutter mechanism 140 closes the tip end insertion hole 156 of the lid body 258, and the needle tip 132 is protected by the protector 252. Furthermore, when relatively moved, the protruding parts 134, 134 of the inner needle 126 are engaged with the base end portion of the protector 252 (base end portion of the small-diameter part 146 of the casing main body 256 or the ring member 148), so that the protector 252 can be moved integrally with the inner needle 126 and the inner needle hub 128.

Subsequently, by pulling the inner needle unit 212 to the proximal side with a predetermined load, as shown in FIG. 13, the pair of convex engaging portions 188, 188 are pushed open by the protector 252 to release the engagement, so that the protector 252 is detached from the cap connector 218. When the engagement is released, the pair of convex engaging portions 188, 188 rides on the external fitting part 264 of the lid body 258, and the protector 252 can freely move toward the proximal side. That is, the pulling force required to move the protector 252 to the proximal side before and after the disengagement is configured to suddenly change, and this sudden change is given to the user as a sense of clicking of the protector 252. Regarding the sense of clicking, the engaging force can be adjusted by changing the shape of the convex engaging portion 188 or the shape of the lid body 258 of the protector 252, particularly the outside diameter dimension of the lid body 258 and the like. When the protector 252 is detached from the cap connector 218 in this way, the outer needle unit (valved needle assembly) 200 is indwelled in the blood vessel of the patient. In this state, the tube 122 is sealed with a clamp or the like, and the connection cap 208 is removed from the connection hub 204. Then, an external flow path such as a connector of an artificial dialysis device or the like (not shown) or a syringe is attached to the connection hub 204.

With the indwelling needle assembly 202 constituted in this way, the engaging force can be adjusted by changing the outside diameter dimension of the lid body 258, as described above. Therefore, by adopting lid bodies 258 with different external dimensions, the engaging force between the cap connector 218 and the protector 252 can be matched to preferences, thereby easily adjusting the engaging force.

Further, the connection cap 208 of the present practical embodiment includes the configuration such that the small-diameter tube part (insertion part) 222 of the outer needle cap 216 is inserted into the tip end tubular part (insertion target part) 240 of the cap connector 218. The locking protrusion 244 is provided on the inner circumferential surface 230a of the tip end tubular part 240, while on the outer circumferential surface 217a of the small-diameter tube part 222, the inclined guide surface 226 is provided at the front end in the direction of insertion, and the engaging hole 224 having a locking part (base end inner face 246) is provided on the back side in the direction of insertion of the inclined guide surface 226. Therefore, when the small-diameter tube part 222 is inserted into the tip end tubular part 240, the locking protrusion 244 is guided by the inclined guide surface 226, and is more reliably guided to the engaging hole 224. In particular, since the locking protrusion 244 and the engaging hole 224 are continuously provided over the entire circumference in the circumferential direction, it is not necessary to position the outer needle cap 216 and the cap connector 218 in the circumferential direction, thereby improving assembly workability. Besides, the relationship between the insertion part and the insertion target part is not limited to the above. The connection cap 208 may include the configuration such that a small-diameter tube part projecting to the tip end side and serving as the insertion part is provided to the cap connector 218, while a tubular part projecting to the base end side and serving as the insertion target part is provided on the outer needle cap 216, and the small-diameter tube part (insertion part) provided to the cap connector 218 is inserted into the tubular part (insertion target part) provided to the outer needle cap 216. In this case, the outer circumferential surface 229 of the disc valve 206 can be pressed radially inward by the small-diameter tube part (insertion part) provided to the cap connector 218.

In addition to the above, the indwelling needle assembly 202 of the present practical embodiment exhibits the same working effects as the indwelling needle assembly 110 of the first practical embodiment.

Although the practical embodiments of the present invention have been described above, the present invention is not limitedly interpreted based on the specific description in the practical embodiment, but may be embodied with various changes, modifications and improvements which may occur to those skilled in the art.

For example, in the preceding practical embodiment, the pressing part for pressing the outer circumferential surface 91, 229 of the disc valve 16, 206 radially inward is constituted by the inner circumferential surface 48a of the peripheral wall 48 of the annular and flat connector cover 44 or by the inner circumferential surface of the small-diameter tube part 222 of the outer needle cap 216, but the present invention is not limited thereto. That is, like a valved needle assembly 280 shown in FIGS. 14 and 15, an annular rib 282 may be provided to the inner circumferential surface 48a of the peripheral wall 48 of the connector cover 44 so as to protrude radially inward and extend from the base end face of the annular wall part 51 to the base end side. By setting the inside diameter dimension of the annular rib 282 smaller than the outside diameter dimension of the disc valve 16 in the isolated state before attachment of the disc valve 16, when the disc valve 16 is attached, the outer circumferential surface 91 of the disc valve 16 is pressed by the annular rib 282 radially inward (toward the axis center). Thus, in the present embodiment, the annular rib 282 constitutes the pressing part. That is, since the inside diameter of the annular rib 282 is smaller than the outside diameter of the outer circumferential surface 91 of the disc valve 16 in the isolated state, the disc valve 16 is configured to be pressed toward the axis center. As a result, blood leakage can be stably prevented.

Further, in the present embodiment, at the tip end of the support tube part 76 of the guide connector 46, an outer circumferential projection 284 protruding radially outward is provided. The outer circumferential projection 284 is continuously formed over the entire circumference and is opposed to the annular rib 282 in the radial direction. The annular rib 282 and the outer circumferential projection 284 sandwich the tubular support part 90 extending from the disc valve 16 toward the base end side in a pressed state, thereby more effectively preventing dislodgment of the disc valve 16 from the connector cover 44 and the guide connector 46.

The pressing part is not limited to the inner circumferential surface 48a of the peripheral wall 48 of the annular and flat connector cover 44, the inner circumferential surface of the small-diameter tube part 222 of the outer needle cap 216, or the annular rib 282 as described above. It is acceptable as long as the outer circumferential surface 91, 229 of the disc valve 16, 206 is pressed radially inward (toward the axis center), and the pressing part may be constituted by a plurality of protrusions or the like that are partially provided in the circumferential direction, for example. Besides, the disc valve 16, 206 is pressed radially inward and fixed by being press-fitted by the pressing part, but may be fixed by using an adhesive or the like as necessary. Moreover, in the case where the slit 88 is provided in the disc valve 16, by providing the pressing part on the radially outer side of the slit 88 of the disc valve 16, stable closing action of the slit 88 in the disc valve 16 can be achieved, and furthermore, in the case where the inner needle 126 is inserted through the disc valve 16, the pressing action of the disc valve 16 against the inner needle 126 is exerted, thereby effectively preventing blood leakage.

Figure 14:
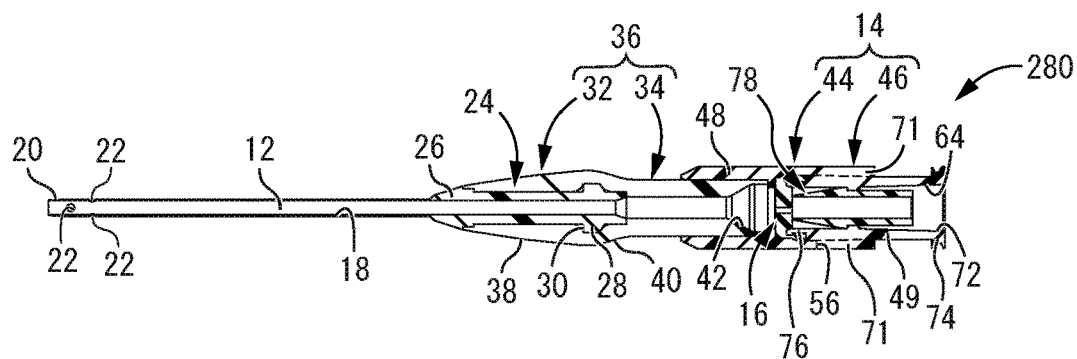
FIG. 14 is a vertical cross sectional view showing a valved needle assembly according to another preferred embodiment of the present invention, which is shown in a cross-sectional position different from that of FIG. 2.
Figure 15:
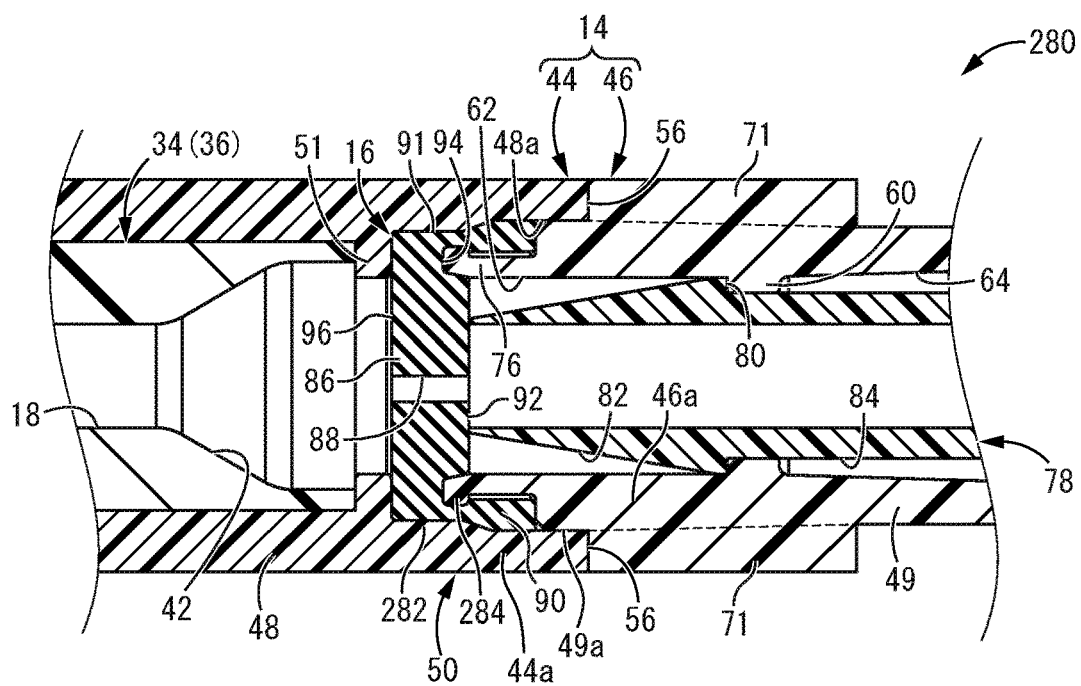
FIG. 15 is an enlarged cross sectional view of a principal part in FIG. 14.

In the preceding first practical embodiment and in the embodiment as shown in FIGS. 14 and 15, when assembling the connector cover 44 and the guide connector 46, the tip end portion of the guide connector 46 is inserted into the base end portion of the connector cover 44. That is, the direction of assembly (direction of insertion) of the guide connector 46 with respect to the connector cover 44 is the direction from the base end side to the tip end side, and the tip end portion of the guide connector 46 is positioned on the radial inside of the base end portion of the connector cover 44, but the present invention is not limited to such embodiments. That is, like a valved needle assembly 290 shown in FIG. 16, a connector cover 292 serving as a pipe body and a guide connector 294 serving as a connector may be assembled in such a way that the base end portion of the connector cover 292 is inserted into the tip end portion of the guide connector 294. In this embodiment, the base end portion of the connector cover 292 is positioned on the radial inside of the tip end portion of the guide connector 294, and the connector cover 292 is inserted and attached with respect to the guide connector 294 in the direction of assembly (direction of insertion) from the tip end side to the base end side. Therefore, the base end side of the connector cover 292 inserted in the guide connector 294 comprises an insertion part 296 having a substantially round tubular shape, while the tip end side of the guide connector 294 into which the insertion part 296 of the connector cover 292 is inserted comprises an insertion target part 298 having a substantially round tubular shape. Thus, a portion where the insertion part 296 is internally disposed in the insertion target part 298 to form a double-walled part comprises an assembly part 299.

In the present practical embodiment, an outer circumferential surface 300 of the connector cover 292 and an inner circumferential surface 302 of the guide connector 294 serve as superposed faces in the assembly part 299 of the connector cover 292 and the guide connector 294. On the outer circumferential surface 300 of the connector cover 292, there are provided locking protrusions 304, 304 having inclined surfaces 303, 303 whose protruding dimension gradually increases from the base end side toward the tip end side (from the front toward the back in the direction of insertion) and protruding radially outward. Meanwhile, on the inner circumferential surface 302 of the guide connector 294, there are provided engaging holes 308, 308 having locking parts 306, 306 to which the locking protrusions 304, 304 are locked, and guide grooves 312, 312 having inclined guide surfaces 310, 310 for guiding the locking protrusions 304, 304. By inserting the connector cover 292 into the guide connector 294, the locking protrusions 304, 304 are brought into abutment against the inclined guide surfaces 310, 310 of the guide grooves 312, 312, so that the tip end opening part of the guide connector 294 slightly undergoes flexural deformation (expanding deformation) and allows the connector cover 292 to be inserted. Besides, the locking protrusions 304, 304 are guided by the inclined guide surfaces 310, 310 and locked to the locking parts 306, 306, whereby the movement of the connector cover 292 from the guide connector 294 to the tip end side (dislodgment of the insertion part 296 from the insertion target part 298) is configured to be prevented.

With the valved needle assembly 290 having the above structure as well, the same effect as the valved needle assembly 10 described in the first practical embodiment can be exhibited.

Moreover, the shape, the material and the like of the needle hub for fixedly supporting the hollow needle 12 are not limited at all. In particular, in the first practical embodiment and in the embodiment shown in FIGS. 14 and 15, the needle hub 32 is formed integrally with the tube 34 positioned on the base end side and formed of soft synthetic resin, but the tube 34 is not essential. That is, the needle hub for fixedly supporting the hollow needle 12 may be constituted by the tip end (connector cover 44) of the connection hub 14. In such a case, it is also possible to firmly fix the hollow needle 12 and the needle hub (connector cover 44) by fitting a sleeve-shaped caulking pin to the connector cover 44. The same applies to the second practical embodiment, namely, the tube 122 is not essential, and the needle hub (outer needle hub) for fixedly supporting the hollow needle 12 may be constituted by the tip end of the connection hub 204.

In the first practical embodiment, the tip end concave groove 98 and the base end concave groove 94 are provided on the tip end surface 96 and the base end surface 92 of the disc valve 16, respectively, and the annular support part 52 provided to the connector cover 44 and the support tube part 76 provided to the guide connector 46 are inserted with respect to the respective concave grooves 98, 94, but these concave grooves 98, 94 are not essential. That is, it would also be acceptable that the tip end surface 96 and the base end surface 92 of the disc valve 16 are both flat surfaces, and when the disc valve 16 is assembled, the annular support part 52 and the support tube part 76 are respectively pressed against and inserted into the tip end surface 96 and the base end surface 92 of the disc valve 16 so that the concave grooves 98, 94 are substantially formed. In the second practical embodiment, the outer needle cap 216 and the cap connector 218 are provided with the pressing protrusions 228, 234 for pressing the disc valves 206, 206 from the tip end side and the base end side, respectively, and these pressing protrusions 228, 234 can be recognized as the annular support part 52 and the support tube part 76 which support the disc valves 206, 206 from the tip end side and the base end side. That is, in the disc valve 206 on the tip end side, a portion on the radially outer side of the pressing protrusion 228 (annular support part) is recognized as the tip end tubular part 102, and in the disc valve 206 on the base end side, a portion on the radially outer side of the pressing protrusion 234 (support tube part) can be recognized as the tubular support part 90. Further, it is not necessary for the concave grooves 98, 94, the annular support part 52 (pressing protrusion 228), and the support tube part 76 (pressing protrusion 234) to be continuously formed over the entire circumference in the circumferential direction, but may alternatively be partially provided in the circumferential direction. When the disc valve 16, 206 is assembled, it is desirable that the inner and outer circumferential surfaces constituting the inner surface of the concave groove 98, 94 and the inner and outer circumferential surfaces of the annular support part 52 (pressing protrusion 228) and the support tube part 76 (pressing protrusion 234) abut against each other, but they need not abut against each other. Indeed, these concave grooves 98, 94, the annular support part 52 (pressing protrusion 228), and the support tube part 76 (pressing protrusion 234) are not essential.

Figure 16:
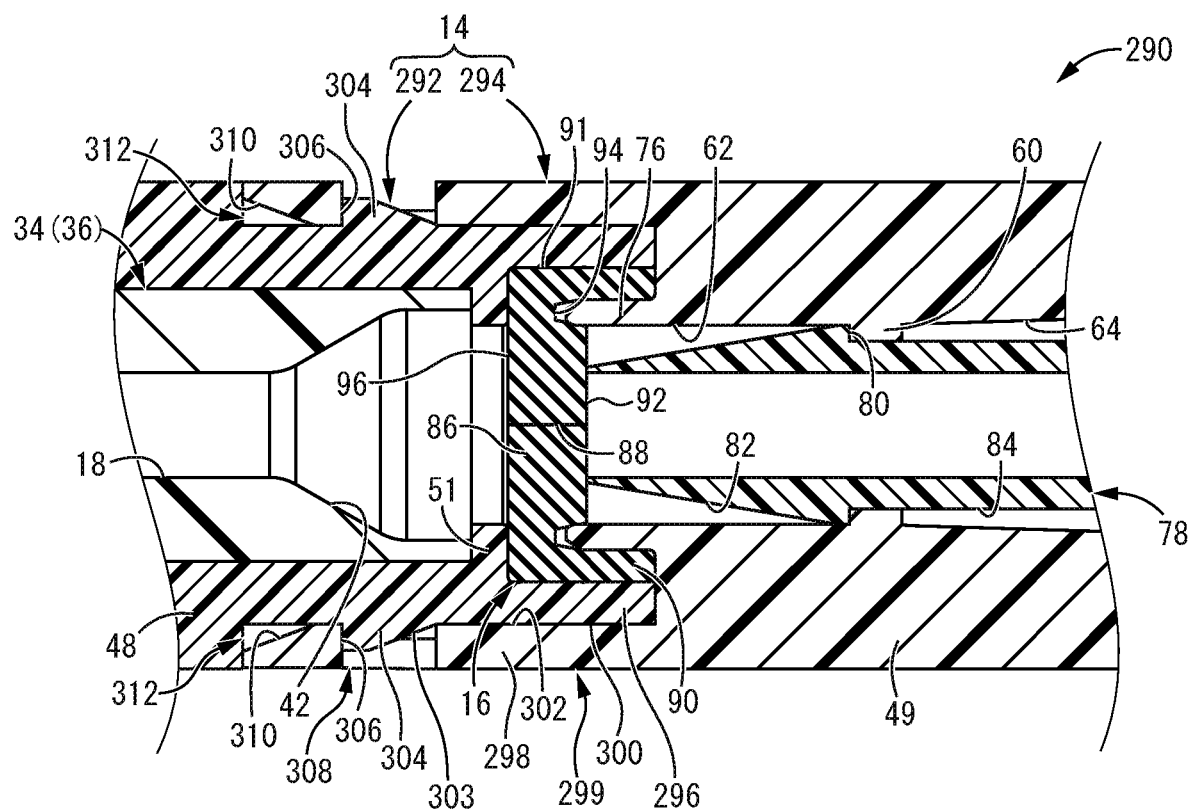
FIG. 16 is a vertical cross sectional view showing a valved needle assembly according to yet another preferred embodiment of the present invention, corresponding to FIG. 3.

Furthermore, in the first practical embodiment and in the embodiments shown in FIGS. 14 to 16, the tubular support part 90 protruding to the base end side is provided on the base end surface 92 of the disc valve 16 and is compressed and supported by the connector cover 44 and the guide connector 46 at least in the radial direction. However, the present invention is not limited to such embodiments. That is, for example, the tubular support part 90 may be supported without being compressed between the connector cover 44 and the guide connector 46. Also, the tubular support part 90 need not be continuously formed over the entire circumference in the circumferential direction but may alternatively be partially provided in the circumferential direction. Indeed, such tubular support part 90 is not essential.

Additionally, in the first practical embodiment and in the embodiments shown in FIGS. 14 to 16, the annular engaging wall part 60 is provided on the inner circumferential surface of the guide connector 46, and the engaging wall part 60 limits the movement of the pusher 78 toward the base end side. However, the engaging wall part 60 is not necessarily provided continuously over the entire circumference in the circumferential direction, but may alternatively be partially provided in the circumferential direction. Also, it would also be acceptable to provide an engaging wall part for limiting the movement of the pusher 78 toward the tip end side on the inner circumferential surface of the guide connector 46 or the like. By providing such an engaging wall part, it is possible to prevent the pusher 78 from excessively moving toward the tip end side, and to prevent damage to the disc valve 16 or the like. The engaging wall part for limiting the movement of the pusher 78 toward the tip end side may be provided simultaneously with the engaging wall part 60 for limiting the movement of the pusher 78 toward the base end side. Alternatively, only the engaging wall part that limits the movement of the pusher 78 toward the tip end side may be provided without providing the engaging wall part 60 that limits the movement of the pusher 78 toward the base end side.

Moreover, the engaging holes 54, 224, 308 provided to one of the pipe body (connector cover 44, 292, or outer needle cap 216) and the connector (guide connector 46, 294, or cap connector 218) may be a through hole as shown in the first practical embodiment or the embodiments shown in FIGS. 14 to 16, or may be a bottomed hole shape as in the second practical embodiment. That is, in the first practical embodiment and in the embodiments shown in FIGS. 14 to 16, the engaging holes 54, 308 may be a bottomed hole shape formed on the inner circumferential surface of the connector cover 44 or the guide connector 294 continuously over the entire circumference in the circumferential direction, for example. Meanwhile, in the second practical embodiment, the engaging hole 224 may be a bottomed hole or a through hole provided circumferentially partially.

Also, in the first practical embodiment and in the embodiments shown in FIGS. 14 and 15, the pair of notch parts 56, 56 are formed in the peripheral wall 48 of the connector cover 44 with a predetermined width dimension. However, the width dimension of the notch parts 56, 56 may be set to substantially zero so as to have a slit shape. That is, by providing the notch parts 56, 56 extending from the opening edge on the base end side toward the tip end side irrespective of the width dimension, the insertion resistance of the guide connector 46 into the connector cover 44 can be reduced. As in the second practical embodiment and in the embodiment shown in FIG. 16, in the case where the pipe body (outer needle cap 216 or connector cover 292) positioned on the tip end side is inserted into the connector (cap connector 218 or guide connector 294) on the base end side, by providing the notch part extending from the opening edge on the tip end side of the connector 218, 294 toward the base end side, the insertion resistance of the pipe body into the connector can be reduced. However, the notch parts 56, 56 and the positioning protrusions 71, 71 provided on the peripheral wall 49 of the guide connector 46 are not essential in the present invention.

Besides, with respect to the means for connecting and fixing the pipe body (connector cover 44, 292, or outer needle cap 216) and the connector (guide connector 46, 294, or cap connector 218), in combination with the concave-convex engagement as described in the preceding practical embodiments or in the embodiments shown in FIGS. 14 to 16, it is possible to adopt various types of conventionally known fixing means such as adhesion, welding, and press-fitting.

Furthermore, in the first practical embodiment and in the embodiments shown in FIGS. 14 to 16, the inclination angle of the inclined surface 68, 303 of the locking protrusion 66, 304 with respect to the axial direction and the inclination angle of the inclined guide surface 57, 310 of the guide groove 58, 312 with respect to the needle axis direction are made approximately equal to each other. However, it is acceptable as long as the inclination directions of the inclined guide surface 57, 310 and the inclined surface 68, 303 are made equal. Thus, their inclination angles with respect to the needle axis direction may be different from each other, as in the second practical embodiment.

Figure 17:
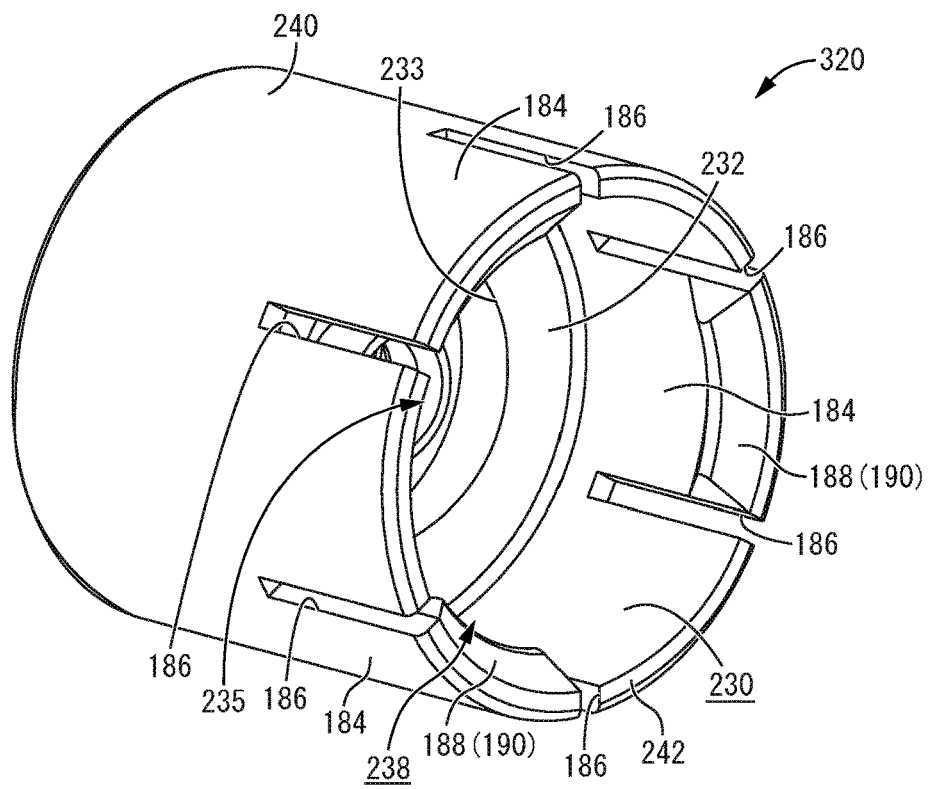
FIG. 17 is an enlarged perspective view showing a connector constituting a valved needle assembly according to still yet another preferred embodiment of the present invention, corresponding to FIG. 11.

Additionally, in the indwelling needle assemblies 110, 202 of the first and second practical embodiments, the luer cap 164 and the cap connector 218 each include two convex engaging portions 188, 188. However, like a cap connector 320 shown in FIGS. 17 and 18, there may be provided three convex engaging portions 188, or alternatively, there may be provided a single convex engaging portion 188 on the circumference, or the one extending continuously over substantially the entire circumference in the circumferential direction. When one or more such convex engaging portions 188 are formed, it is preferable that the flexible piece 184 is correspondingly formed for each convex engaging portion 188. In the first practical embodiment, when one or more flexible pieces 184 are provided on the luer cap 164, it is preferable that, in the outer needle cap 162 housing the luer cap 164, the notch 172 is provided at a location corresponding to each flexible piece 184. Further, the shape of the convex engaging portions 188, 188 is not limited to the mountain shape in cross section, but may be a semicircular or arcuate shape in cross section, thus the shape thereof is no object.

In addition, the inner needle unit 114, 212 used as the indwelling needle assembly 110, 202 in combination with the outer needle unit 116, 200 is not limited to those described in the above practical embodiments, but conventionally known inner needle units may be employed. However, in the case where the hollow needle 12 is made of metal or rigid synthetic resin as described above, the inner needle unit 114, 212 is not essential, but the valved needle assembly 10, 119, 200, 280, 290 may be used by directly puncturing the patient.

Figure 18:
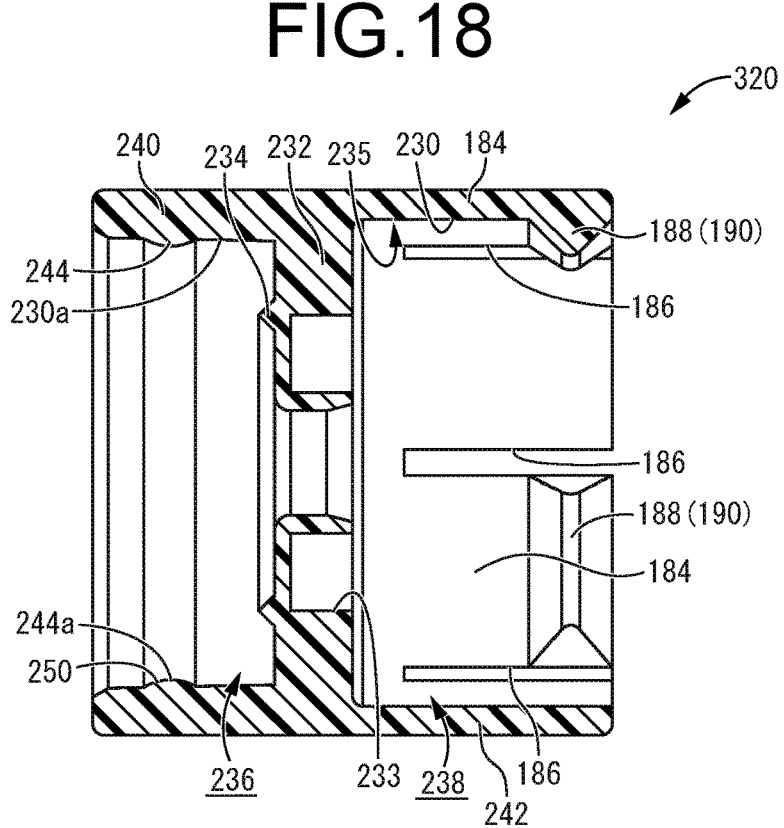
FIG. 18 is a vertical cross sectional view of the connector shown in FIG. 17.

Moreover, in the first and second practical embodiments as well as in the embodiment shown in FIG. 18, the tip end portion of the protector 112, 252 is inserted into the housing part 180 of the luer cap 164 and the proximal region 238 of the cap connector 218, 320, while at the base end portion of the luer cap 164 and the cap connector 218, 320, the flexible piece 184 is provided so as to be deformable radially outward in a flexural manner, and on the inner circumferential surface of the projecting tip end portion of the flexible piece 184, the convex engaging portion 188 (engaging part 190) is provided so as to be engaged with the tapered portion 142 and the large-diameter part 144 (engaging target part) of the protector 112, 252. However, the present invention is not limited to such an embodiment. That is, even in the case where the tip end portion of the protector 112, 252 is inserted into the luer cap 164 and the cap connector 218, 320 like the first and second practical embodiments as well as the practical embodiment shown in FIG. 18, it would be acceptable, for example, to provide a flexible piece 184, which includes a convex engaging portion 188 projecting radially outward, so as to extend in the lengthwise direction of the protector 112, 252, while providing an engaging target part, which projects radially inward, to the luer cap 164 and the cap connector 218, 320 at the sites corresponding to the convex engaging portion 188 (engaging part 190) of the protector 112, 252. By so doing, the cap body (luer cap 164 or cap connector 218, 320) and the protector 112, 252 may be connected by the engaging part 190 and the engaging target part being engaged with each other. In this case, by pulling out the inner needle unit 114, 212 from the outer needle unit 116, 200, the flexible piece 184 flexes radially inward so as to release the engagement between the engaging part 190 and the engaging target part, whereby the protector 112, 252 can be detached from the cap body 164, 218, 320. It would alternatively be acceptable that the base end portion of the cap body 164, 218, 320 is configured to be inserted into the tip end portion of the protector 112, 252. In this case as well, a flexible piece 184 having a convex engaging portion 188 (engaging part 190) is provided to either one of the protector 112, 252 and the cap body 164, 218, 320, while an engaging target part to be engaged with the engaging part 190 is provided to the other. Then, by pulling out the inner needle unit 114, 212 from the outer needle unit 116, 200, the flexible piece 184 flexes radially outward or inward, and the protector 112, 252 can be detached from the cap body 164, 218, 320. That is, it would be acceptable as long as the engaging part 190 is provided to one of the cap body 164, 218, 320 and the protector 112, 252, while the engaging target part is provided to the other.

Additionally, each preferred embodiment of the indwelling needle assembly described hereinbelow can be recognized as an independent invention capable of solving a different problem from that of the present invention.

That is, with regard to the indwelling needle assembly disclosed in Japanese Patent No. JP-B-5880983, the distal side end of the protector is inserted into the outer needle cap, and the distal side end of the protector and the outer needle cap are provided with respective fixed magnets at the mutually corresponding positions so that the protector can be attached to and detached from the outer needle cap. The fixed magnets are configured to be attracted to each other by aligning the positions of the fixed magnets with each other when the distal side end is inserted into the outer needle cap. By so doing, the protector is configured to be held within the outer needle cap. In addition, when pulling out the inner needle to the proximal side, by applying a force greater than the attractive force between the fixed magnets to the protector, the protector can be detached from the outer needle cap.

The fixed magnet used in the indwelling needle assembly described in the above-mentioned Japanese Patent No. JP-B-5880983 is able to exhibit a small and stable attractive force, so that it is possible to easily detach the protector from the outer needle cap. On the other hand, since the attractive force of the fixed magnet is small, there may be a case where the feeling that the protector is detached from the outer needle cap when detaching the protector from the outer needle cap, that is, the sense of clicking from the protector is not transmitted to the operator. This is because the sense of clicking depends on the force that the operator pulls the protector when detaching the protector from the outer needle cap, that is, the attracting force between the fixed magnets. Thus, in order to obtain a feeling of escape as required by the operator, it is necessary to adjust the attracting force between the fixed magnets (more specifically, to increase the attracting force). However, with fixed magnets that can be incorporated in indwelling needle assemblies, the attracting force between the fixed magnets is low, and it is impossible to give a sense of clicking as required by the operator. Also, in the case of a fixed magnet, the attractive force sharply decreases by merely the magnets being slightly deviated from each other. Therefore, the degree of freedom in designing the fixed magnet is low, and it is difficult to adjust the sense of clicking itself.

Therefore, in the preferred embodiments described below, it is an object to provide an indwelling needle assembly capable of adjusting a sense of clicking when the protector is detached from the cap body.

A first preferred embodiment provides an indwelling needle assembly comprising: an inner needle unit comprising an inner needle having a sharp needle tip on a distal side thereof, and an inner needle hub provided on a proximal side of the inner needle; an outer needle unit comprising an outer needle into which the inner needle is inserted, and an outer needle hub to which the outer needle is attached at a distal side opening thereof and into which the inner needle is inserted from a proximal side opening thereof; a protector provided to the inner needle unit and into which the inner needle is inserted movably in a needle axis direction, and configured to be able to house and protect the needle tip of the inner needle; and a cap body provided on a proximal side of the outer needle unit and configured such that the protector is movable in the needle axis direction relatively to the cap body, wherein the protector is movable together with the inner needle to the proximal side relatively to the cap body with the needle tip housed in the protector, an engaging part and an engaging target part that are engaged with each other are formed at mutually corresponding sites between the cap body and the protector, the engaging part and the engaging target part hold the protector in a connected state to the cap body by mutual engagement, and when the protector moves from the connected state to the proximal side, the engaging part and the engaging target part release the engagement while generating a sense of clicking such that the protector is allowed to be detached from the cap body.

A second preferred embodiment provides the indwelling needle assembly according to the first preferred embodiment, wherein the engaging part includes at least one convex engaging portion.

A third preferred embodiment provides the indwelling needle assembly according to the second preferred embodiment, the cap body includes a plurality of flexible pieces that flex in a radial direction, and the at least one convex engaging portion comprises a plurality of convex engaging portions, and the convex engaging portions are disposed correspondingly to the respective flexible pieces.

A fourth preferred embodiment provides the indwelling needle assembly according to the third preferred embodiment, wherein the outer needle unit further comprises an outer needle cap provided on a proximal side of the outer needle hub and into which a distal side of the cap body is inserted, the flexible pieces are spaced from each other in a circumferential direction, and the outer needle cap includes notches formed at positions corresponding to the respective flexible pieces.

A fifth preferred embodiment provides the indwelling needle assembly according to any of the first to fourth preferred embodiments, wherein the protector includes a large-diameter part on a distal side thereof, the large-diameter part being larger in diameter than a portion on a proximal side thereof, the large-diameter part includes a housing space that houses the needle tip, and a shutter mechanism that closes the housing space, the cap body includes the engaging part, and the large-diameter part serves as the engaging target part and is configured to be engaged with the engaging part of the cap body.

A sixth preferred embodiment provides the indwelling needle assembly according to any of the first to fourth preferred embodiments, wherein the protector includes a large-diameter part on a distal side thereof, the large-diameter part being larger in diameter than a portion on a proximal side thereof, the large-diameter part includes a housing space that houses the needle tip, and a shutter mechanism that closes the housing space, a lid body serving as the engaging target part is externally mounted on the large-diameter part, and the engaging part is configured to be engaged with the lid body.

According to the indwelling needle assembly structured following these preferred embodiments, the cap body and the protector can be physically coupled by the engaging part and the engaging target part. Thus, by adjusting the shapes of the engaging part and the engaging target part, the degree of engagement of the engaging part and the engaging target part, that is, the engaging force can be adjusted. This makes it possible to adjust the pulling force required for the operator when detaching the protector from the cap body, thereby adjusting the sense of clicking when detaching the protector from the cap body and preventing accidental detachment thereof.

KEYS TO SYMBOLS 10, 119, 200, 280, 290: valved needle assembly, 12: hollow needle (outer needle), 14, 204: connection hub, 16, 206: disc valve (valve body), 32: needle hub, 43: tube connecting part, 44, 292: connector cover (pipe body), 46, 294: guide connector (connector), 46a, 296a: insertion part, 48: peripheral wall of the connector cover, 49: peripheral wall of guide connector, 48a: inner circumferential surface of connector cover (superposed face, pressing part), 49a: inner circumferential surface of guide connector (superposed face), 50: assembly part, 52: annular support part, 54, 224, 308: engaging hole, 56: notch part, 67, 226, 310: inclined guide surface, 58, 312: guide groove, 60: engaging wall part, 66, 244, 304: locking protrusion, 68: inclined surface, 74: connection projection, 77: inner hole of pusher, 78: pusher, 86: central portion, 88: slit, 90: tubular support part, 91, 229: outer circumferential surface of disc valve, 92: base end surface, 94: base end concave groove, 96: tip end surface, 98: tip end concave groove, 102: tip end tubular part, 105, 246: base end inner face (locking part), 110, 202: indwelling needle assembly, 112, 252: protector, 114, 212: inner needle unit, 116: outer needle unit, 118, 208: connection cap, 120: outer needle hub, 126: inner needle, 128: inner needle hub, 132: needle tip, 140: shutter mechanism, 142: tapered portion (engaging target part), 144: large-diameter part (engaging target part), 150, 258: lid body, 151, 268: housing space, 162: outer needle cap, 164: luer cap (cap body), 172: notch, 184: flexible piece, 188: convex engaging portion, 190: engaging part, 216: outer needle cap (pipe body), 217a: outer circumferential surface of small-diameter tube part (superposed face), 218, 320: cap connector (connector, cap body), 222: small-diameter tube part (insertion part, pressing part), 230*a*: inner circumferential surface of tip end tubular part (superposed face), 235: inner hole of cap connector, 240: tip end tubular part (insertion target part), 250: tip end surface (inclined surface), 264: external fitting part (engaging target part), 282: annular rib (pressing part), 299: assembly part, 300: outer circumferential surface of connector cover (superposed face), 302: inner circumferential surface of guide connector (superposed face), 303: inclined surface, 306: locking part

The invention claimed is:

1. An indwelling needle assembly comprising:
an inner needle unit comprising an inner needle having a sharp needle tip on a distal side of the inner needle, and an inner needle hub provided on a proximal side of the inner needle;
an outer needle unit comprising an outer needle into which the inner needle is inserted, and an outer needle hub to which the outer needle is attached at a distal side opening thereof and into which the inner needle is inserted from a proximal side opening thereof;
a protector provided to the inner needle unit and into which the inner needle is inserted movably in a needle axis direction, having a hollow cylindrical shape with a large-diameter part formed on a distal side and a small-diameter part formed on a proximal side, and configured to be able to house and protect the needle tip of the inner needle; and
a cap body provided on a proximal side of the outer needle unit and configured such that the protector is movable in the needle axis direction relatively to the cap body, wherein
the protector is movable together with the inner needle in a proximal direction relatively to the cap body with the needle tip housed in the protector,
an engaging part and an engaging target part that are engaged with each other are formed at mutually corresponding sites between the cap body and the protector,
the engaging part and the engaging target part hold the protector in a connected state to the cap body by mutual engagement, and the protector is configured to move from the connected state towards the proximal direction to release the mutual engagement, the engaging part and the engaging target part configured to release the mutual engagement while generating a sense of clicking, such that the protector is allowed to be detached from the cap body,
the engaging part includes at least one convex engaging portion formed at an inner circumferential surface of the cap body, the at least one convex engaging portion being configured to be disposed radially outward of and engaged with the engaging target part that is formed on an outer circumferential surface of the protector by a step between the large-diameter part and the small-diameter part of the protector,
the cap body includes at least one flexible piece that flexes in a radially outward direction, and the at least one convex engaging portion is formed on the at least one flexible piece,
the at least one convex engaging portion formed on the at least one flexible piece of the cap body is covered by the inner needle hub from radially outside of the at least one flexible piece,
the protector has a casing main body, a lid body fixed to the casing main body, and a shutter mechanism including a shielding member and a fixing member, at least one of which comprises a magnet,
the lid body includes a central portion fitted into a distal side opening part of the casing main body and housed inside the casing main body, a fix-part fixed to the distal side opening part of the casing main body, and an intermediate insertion hole and a tip end insertion hole through which the inner needle is inserted,
the central portion of the lid body has a housing space therein, the housing space being formed between the intermediate insertion hole and the tip end insertion hole so as to house the shielding member, and the shielding member is configured to be attracted to the fixing member when the inner needle moves to the proximal side across the tip end insertion hole, so as to close the intermediate insertion hole by moving in the housing space in the axis-perpendicular direction of the inner needle, and
the fix-part includes a locking window, and a locking claw is formed on the outer circumferential surface of the distal side of the casing main body, the locking claw protruding radially outward from the outer circumferential surface, the locking claw being configured to be fitted and locked into the locking window, so as to allow the lid body to be externally mounted in a fixed manner so as to cover the distal side opening part of the casing main body.

2. The indwelling needle assembly according to claim 1, wherein
the at least one flexible piece comprises a plurality of flexible pieces, and
the at least one convex engaging portion comprises a plurality of convex engaging portions, and each of the plurality of convex engaging portions are disposed correspondingly to a respective one of the flexible pieces.

3. The indwelling needle assembly according to claim 1, wherein
the protector includes the large-diameter part on the distal side, the large-diameter part being larger in diameter than a portion on the proximal side,
the large-diameter part includes the housing space and the shutter mechanism,
the cap body includes the engaging part, and
the large-diameter part serves as the engaging target part and is configured to be engaged with the engaging part of the cap body.

4. The indwelling needle assembly according to claim 1, wherein
the protector includes the large-diameter part on the distal side, the large-diameter part being larger in diameter than a portion on the proximal side,
the large-diameter part includes the housing space and the shutter mechanism,
the lid body serving as the engaging target part is externally mounted on the large-diameter part, and
the engaging part is configured to be engaged with the lid body.

5. The indwelling needle assembly according to claim 1, wherein
the protector includes the casing main body, the lid body provided radially outside of the casing main body, and the fix-part provided on the distal side opening part of the casing main body,
the engaging target part includes the fix-part that provides the convex part, and the engaging part and the engaging target part are configured to release the mutual engagement by the at least one convex engaging portion riding on the fix-part, while generating the sense of clicking, such that the protector is allowed to be detached from the cap body and the protector can freely move toward the proximal side.

6. The indwelling needle assembly according to claim 5, wherein the lid body integrally includes the central portion fitted in the distal side opening part of the casing main body and the fix-part fitted externally onto the distal side opening part of the casing main body, and the central portion of the lid body of the protector houses the shutter mechanism configured to close an insertion hole through which the inner needle is inserted, when the inner needle is removed.

7. The indwelling needle assembly according to claim 1, wherein a positioning convex part is provided on a tip end surface of the protector, the positioning convex part configured to be fitted in a positioning concave part provided in the cap body so as to position the cap body and the protector in a radial direction.

8. The indwelling needle assembly according to claim 1, wherein the cap body has a tubular shape so that the protector is inserted into the cap body, the cap body includes the at least one flexible piece formed between a pair of notched grooves penetrating a circumferential wall of the cap body in a radial direction at respective circumferential positions circumferentially spaced away from each other while extending axially inwardly from a proximal end of the cap body so that the at least one flexible piece flexes in the radially outward direction and that the circumferential wall of the cap body is provided at circumferentially both sides of the at least one flexible piece, and the at least one convex engaging portion is formed on the at least one flexible piece.

9. The indwelling needle assembly according to claim 1, wherein the shielding member is guided in the housing space.

10. The indwelling needle assembly according to claim 1, wherein the lid body includes the intermediate insertion hole formed in an intermediate wall, the tip end insertion hole formed in a tip end wall and the housing space formed between the intermediate wall and the tip end wall.

11. The indwelling needle assembly according to claim 1, wherein the engaging target part is formed on the outer surface of the casing main body.

* * * * *